US011881642B2

(12) United States Patent
Kim et al.

(10) Patent No.: US 11,881,642 B2

(45) Date of Patent: Jan. 23, 2024

(54) ANTENNA APPARATUS

(71) Applicant: Samsung Electro-Mechanics Co., Ltd., Suwon-si (KR)

(72) Inventors: Nam Ki Kim, Suwon-si (KR); Jeong Ki Ryoo, Suwon-si (KR); Won Cheol Lee, Suwon-si (KR); Jae Min Keum, Suwon-si (KR); Dong Ok Ko, Suwon-si (KR); Shin Haeng Heo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 17/022,542

(22) Filed: Sep. 16, 2020

(65) Prior Publication Data

US 2021/0242591 A1 Aug. 5, 2021

Related U.S. Application Data

(63) Continuation of application No. 16/855,368, filed on Apr. 22, 2020, now Pat. No. 11,777,219.

(30) Foreign Application Priority Data

Jan. 30, 2020 (KR) ........................ 10-2020-0010762

(51) Int. Cl.

*H01Q 9/04* (2006.01)

*H01Q 21/06* (2006.01)

(Continued)

(52) U.S. Cl.

CPC ............. *H01Q 9/045* (2013.01); *H01Q 1/243* (2013.01); *H01Q 1/48* (2013.01); *H01Q 21/0025* (2013.01); *H01Q 21/065* (2013.01)

(58) Field of Classification Search

CPC .......... H01Q 9/045; H01Q 1/243; H01Q 1/48; H01Q 21/0025; H01Q 21/065;

(Continued)

(56) References Cited

U.S. PATENT DOCUMENTS 10,476,149 B1 * 11/2019 Ueda ...................... H01Q 21/08

2005/0054317 A1 * 3/2005 Ro .......................... H01Q 5/42 455/575.1

(Continued)

FOREIGN PATENT DOCUMENTS

CN 203942014 U 11/2014

CN 108023174 A 5/2018

(Continued)

OTHER PUBLICATIONS

Korean Office Action dated Nov. 19, 2020 in counterpart Korean Patent Application No. 10-2020-0010762 (7 pages in English and 5 pages in Korean).

(Continued)

*Primary Examiner* — Hai V Tran

*Assistant Examiner* — Bamidele A Immanuel

(74) *Attorney, Agent, or Firm* — NSIP Law

(57) ABSTRACT

An antenna apparatus includes a dielectric layer; a patch antenna pattern disposed on an upper surface of the dielectric layer and including an upper surface having a polygonal shape, a plurality of feed vias respectively disposed to penetrate the dielectric layer by at least a portion of a thickness of the dielectric layer, respectively disposed to be biased toward a first side and a second side, different from each other, from a center of the polygonal shape of the patch antenna pattern, and respectively disposed to be spaced apart from the patch antenna pattern, and a plurality of feed patterns respectively electrically connected to an upper end of a corresponding feed via, among the plurality of feed vias, (Continued)

respectively disposed to be spaced apart from the patch antenna pattern, and configured to provide a feed path to the patch antenna pattern, wherein the polygonal shape of the patch antenna pattern has a structure in which the first side and a third side between the first and second sides form an obtuse angle, and the third side and the second side form an obtuse angle.

23 Claims, 19 Drawing Sheets

(51) Int. Cl.
*H01Q 1/48* (2006.01)
*H01Q 1/24* (2006.01)
*H01Q 21/00* (2006.01)

(58) Field of Classification Search
CPC .... H01Q 9/0435; H01Q 21/08; H01Q 19/005; H01Q 1/38; H01Q 9/0485; H01Q 5/50
See application file for complete search history.

(56) References Cited

U.S. PATENT DOCUMENTS

2006/0044191 A1* 3/2006 Harihara .............. H01Q 1/2283 343/700 MS
2009/0284423 A1* 11/2009 Yi ........................ H01Q 1/2283 343/702
2009/0322642 A1* 12/2009 Foo ........................ H01Q 1/42 343/843
2011/0001682 A1* 1/2011 Rao ...................... H01Q 21/065 343/893
2011/0050505 A1 3/2011 Lim et al.
2012/0299797 A1* 11/2012 Murdock ............. H01Q 15/008 343/893
2012/0319904 A1* 12/2012 Lee .......................... H01Q 9/42 343/700 MS
2013/0106671 A1 5/2013 Eom et al.
2014/0028524 A1* 1/2014 Jerauld .................... H01Q 1/52 343/893
2014/0139387 A1* 5/2014 Jones ...................... H01Q 21/30 343/794
2014/0152520 A1* 6/2014 Toyao ................... H01P 1/2005 333/238
2015/0295324 A1 10/2015 Kletsov et al.
2016/0013558 A1* 1/2016 Hwang ................ H01Q 9/0414 343/906
2016/0104934 A1* 4/2016 Jang ....................... H01Q 21/26 343/834
2017/0317402 A1* 11/2017 Hwang .................... H01Q 1/24
2018/0034567 A1* 2/2018 Deriso .................. G06F 11/261
2018/0123222 A1* 5/2018 Jang .................... H01Q 19/005
2018/0159203 A1* 6/2018 Baks ...................... H01Q 9/045
2018/0198212 A1* 7/2018 Rodríguez ............... H01Q 9/16
2018/0269585 A1* 9/2018 Kim ..................... H01Q 15/242
2019/0020100 A1* 1/2019 Jong ........................ H01Q 1/48
2019/0098750 A1* 3/2019 Woo ..................... H01Q 9/0457
2019/0207314 A1* 7/2019 Oladeinde .............. H01Q 9/045
2019/0229398 A1* 7/2019 Ryoo ....................... H01Q 3/44
2019/0305432 A1* 10/2019 Kim ......................... H01Q 1/38
2019/0319338 A1* 10/2019 Gu .......................... H01L 24/16
2019/0326672 A1* 10/2019 Lim ..................... H01Q 19/005
2019/0326674 A1* 10/2019 Kang ................... H01Q 21/065
2019/0333882 A1* 10/2019 Kamgaing ........ H01L 23/49827
2019/0334233 A1* 10/2019 Kim ....................... H01Q 21/28
2020/0013735 A1* 1/2020 Liu ....................... H01L 23/481
2020/0021010 A1* 1/2020 Ou ....................... H01Q 21/065
2020/0021037 A1* 1/2020 Wu ...................... H01Q 9/0457
2020/0028269 A1* 1/2020 Kim ........................ H01Q 19/28
2020/0106188 A1* 4/2020 Ou ......................... H01Q 5/357
2020/0303805 A1 9/2020 Ryoo et al.
2020/0358173 A1 11/2020 Jong et al.
2020/0412017 A1* 12/2020 Park ........................ H01Q 1/526
2021/0044028 A1* 2/2021 Lee ........................ H01Q 21/24
2021/0151853 A1* 5/2021 Park ..................... H01Q 21/065
2021/0151899 A1* 5/2021 Park ..................... H01Q 21/065
2021/0242604 A1* 8/2021 Lee ........................ H01Q 1/243

FOREIGN PATENT DOCUMENTS

CN 110071369 A 7/2019
CN 110323560 A 10/2019
CN 110391494 A 10/2019
CN 209515999 U 10/2019
GB 2559001 A 7/2018
JP 2019-220886 A 12/2019
JP 2020-14190 A 1/2020
KR 101174739 B1 * 8/2011 ............. H01Q 13/08
KR 10-2011-0126488 A 11/2011
KR 10-1472894 B1 12/2014
KR 10-2015-0118880 A 10/2015
KR 10-1579894 B1 12/2015
KR 10-2016-0042740 A 4/2016
KR 10-2018-0006811 A 1/2018
KR 10-2019-0086774 A 7/2019
KR 10-2019-0120134 A 10/2019
KR 10-2117513 B1 6/2020
KR 10-2137198 B1 7/2020
WO WO 2018/004611 A1 1/2018

OTHER PUBLICATIONS

Korean Notice of Allowance dated May 17, 2021, in Counterpart Korean Application No. 10-2020-0010762 (1 page in English and 5 pages in Korean).
Sharma, Devendra Kumar et al., "Shared Aperture Dual Band Dual Polarization Microstrip Patch Antenna", *Microwave and Optical Technology Letters*, vol. 55, Issue 4, 2013 (pp. 917-922).
Lai, Hau Wah, et al., "An L-Probe Fed Patch Antenna Loaded with Multiple Dielectric Layers." *2015 IEEE 4th Asia-Pacific Conference on Antennas and Propagation* (APCAP), IEEE, 2015 (pp. 263-264).
United States Office Action dated Jul. 14, 2022, in related U.S. Appl. No. 16/855,368 (17 pages in English).
Korean Office Action dated Apr. 22, 2022, in counterpart Korean Patent Application No. 10-2020-0118074 (2 pages in English and 3 pages in Korean).
Notice of Allowance dated Jun. 21, 2023, in U.S. Appl. No. 16/855,368 (9 pages in English).
Chinese Office Action dated Jan. 31, 2023, in counterpart Chinese Patent Application No. 202011451036.3 (15 pages in English, 9 pages in Chinese).
Lindmark, Björn. "Comparison of Mutual Coupling Compensation to Dummy Columns in Adaptive Antenna Systems." IEEE transactions on antennas and propagation 53.4 (2005): 1332-1336.
Wang, et al. "L-band Circularly Polarized Patch Antenna with Wide Axial Ratio Bandwidth" Modern Electronics Technique, Apr. 2011, (English Abstract, 3 pages in Chinese).
Zhou, B., et al., "Design of wide-band aperture-stacked patch microstrip antennas," Information Technology and Network Security, vol. 37, No. 2, Feb. 10, 2018, pp. 72-76 (in Chinese with English abstract).
Chinese Office Action dated Jun. 26, 2023, in counterpart Chinese Patent Application No. 202011451036.3 (4 pages in English, 5 pages in Chinese).

* cited by examiner

ANTENNA APPARATUS

CROSS-REFERENCE TO RELATED APPLICATIONS

This application is a continuation of U.S. patent application Ser. No. 16/855,368 filed on Apr. 22, 2020, which claims the benefit under 35 USC 119(a) of Korean Patent Application No. 10-2020-0010762 filed on Jan. 30, 2020, in the Korean Intellectual Property Office, the entire disclosures of which are incorporated herein by reference for all purposes.

BACKGROUND

1. Field

The present disclosure relates to an antenna apparatus.

2. Description of the Background

Data traffic for mobile communications is increasing rapidly every year. Technological development is underway to support the transmission of such rapidly increased data in real time in wireless networks. For example, the contents of internet of things (IoT) based data, augmented reality (AR), virtual reality (VR), live VR/AR combined with social network service (SNS), autonomous navigation, applications such as Sync View (real-time video user transmissions using ultra-small cameras), and the like may require communications (e.g., 5G communications, mmWave communications, etc.) supporting the transmission and reception of large amounts of data.

Millimeter wave (mmWave) communications, including 5th generation (5G) communications, have been researched, and research into the commercialization/standardization of an antenna apparatus for smoothly realizing such communications is progressing.

Since radio frequency (RF) signals in high frequency bands (e.g., 24 GHz, 28 GHz, 36 GHz, 39 GHz, 60 GHz, etc.) are easily absorbed and lost in the course of the transmission thereof, the quality of communications may be dramatically reduced. Therefore, antennas for communications in high frequency bands may require different approaches from those of conventional antenna technology, and a separate approach may require further special technologies, such as implementing separate power amplifiers for securing antenna gain, integrating an antenna and radio frequency integrated circuit (RFIC), securing effective isotropic radiated power (EIRP), and the like.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an antenna apparatus includes a dielectric layer, a patch antenna pattern disposed on an upper surface of the dielectric layer and including an upper surface having a polygonal shape, a plurality of feed vias respectively disposed to penetrate the dielectric layer by at least a portion of a thickness of the dielectric layer, respectively disposed to be biased toward a first side and a second side, different from each other, from a center of the polygonal shape of the patch antenna pattern, and respectively disposed to be spaced apart from the patch antenna pattern, and a plurality of feed patterns respectively electrically connected to an upper end of a corresponding feed via, among the plurality of feed vias, respectively disposed to be spaced apart from the patch antenna pattern, and configured to provide a feed path to the patch antenna pattern, wherein the polygonal shape of the patch antenna pattern has a structure in which the first side and a third side between the first and second sides form an obtuse angle, and the third side and the second side form an obtuse angle.

At least a portion of each of the plurality of feed patterns may be coiled.

Each of the plurality of feed patterns may include a first coiled feed pattern comprising one end electrically connected to the corresponding feed via, among the plurality of feed vias, an inductive via comprising one end electrically connected to the other end of the first coiled feed pattern, and a second feed pattern comprising one end electrically connected to the other end of the inductive via and disposed to comprise at least a portion overlapping the first coiled feed pattern in a vertical direction.

The patch antenna pattern may be disposed such that the first and second sides overlap the plurality of feed patterns in the vertical direction.

A length of the third side in the patch antenna pattern may be different from a length of each of the first and second sides in the patch antenna pattern.

The upper surface of the patch antenna pattern may have an octagonal shape, and the length of the third side may be shorter than the length of each of the first and second sides.

The patch antenna pattern may be disposed such that the first and second sides are oblique to each side of the upper surface of the dielectric layer.

The antenna apparatus may further include a plurality of extended patch antenna patterns respectively disposed to be spaced apart from the plurality of feed patterns, respectively disposed to be biased toward the first side and the second side from the center of the polygonal shape of the patch antenna pattern, and respectively disposed to be spaced apart from the patch antenna pattern.

The plurality of feed vias may be arranged to overlap at least one of the plurality of extended patch antenna patterns and the patch antenna pattern in a vertical direction.

Each of the plurality of extended patch antenna patterns may include a second extended patch antenna pattern and a first extended patch antenna pattern disposed to be spaced apart from the second extended patch antenna pattern and disposed between the second extended patch antenna pattern and the patch antenna pattern.

The antenna apparatus may further include a plurality of first dummy patterns respectively having a polygonal shape and arranged three-dimensionally between the plurality of feed patterns on a level between the patch antenna pattern and the plurality of feed patterns.

In another general aspect, an antenna apparatus includes a ground plane, a patch antenna pattern disposed on an upper surface of the ground plane and including an upper surface having a polygonal shape, a plurality of feed vias respectively disposed to penetrate the ground plane, respectively disposed to be biased toward a first side and a second side, different from each other, from a center of the polygonal shape of the patch antenna pattern, and respectively disposed to be spaced apart from the patch antenna pattern, a plurality of feed patterns respectively electrically connected to an upper end of a corresponding feed via, among the plurality of feed vias, respectively disposed to be spaced apart from the patch antenna pattern, and configured to provide a feed path to the patch antenna pattern, and a plurality of first dummy patterns respectively having a polygonal shape and arranged three-dimensionally between the plurality of feed patterns on a level between the patch antenna pattern and the plurality of feed patterns.

The antenna apparatus may further include a plurality of second dummy patterns respectively comprising a polygonal shape and arranged three-dimensionally to surround a space in which the plurality of first dummy patterns are arranged, wherein a space between the plurality of feed patterns on a level between the patch antenna pattern and the plurality of feed patterns is surrounded by the plurality of first dummy patterns and the plurality of second dummy patterns.

A side of each of the plurality of first dummy patterns may be oblique to a side of each of the plurality of second dummy patterns.

At least a portion of each of the plurality of feed patterns may be coiled.

In another general aspect, an antenna apparatus includes a dielectric layer, a patch antenna pattern disposed on an upper surface of the dielectric layer and including an upper surface having a polygonal shape, a plurality of feed vias respectively disposed to penetrate the dielectric layer by at least a portion of a thickness of the dielectric layer, respectively disposed to be biased toward a first side and a second side, different from each other, from a center of the polygonal shape of the patch antenna pattern, and respectively disposed to be spaced apart from the patch antenna pattern, a plurality of feed patterns respectively electrically connected to an upper end of a corresponding feed via, among the plurality of feed vias, respectively disposed to be spaced apart from the patch antenna pattern, and configured to provide a feed path to the patch antenna pattern, and a plurality of extended patch antenna patterns respectively disposed to be spaced apart from the plurality of feed patterns, respectively disposed to be biased toward the first side and the second side from the center of the polygonal shape of the patch antenna pattern, and respectively disposed to be spaced apart from the patch antenna pattern, wherein at least a portion of the plurality of feed patterns is disposed to overlap a corresponding extended patch antenna pattern, among the plurality of extended patch antenna patterns, in a vertical direction, and is coiled.

Each of the plurality of extended patch antenna patterns may include a second extended patch antenna pattern, and a first extended patch antenna pattern disposed to be spaced apart from the second extended patch antenna pattern and disposed between the second extended patch antenna pattern and the patch antenna pattern, wherein a width of the second extended patch antenna pattern may be different from a width of the first extended patch antenna pattern.

Each of the plurality of extended patch antenna patterns may include a second extended patch antenna pattern, and a first extended patch antenna pattern disposed to be spaced apart from the second extended patch antenna pattern and disposed between the second extended patch antenna pattern and the patch antenna pattern, wherein the upper surface of the patch antenna pattern may have an octagonal shape, the number of the first extended patch antenna pattern may be less than 8, and the number of the second extended patch antenna pattern may be less than 8.

An upper surface of each of the first and second extended patch antenna patterns may have a rectangular shape.

Sides of the rectangular shape of each of the first and second extended patch antenna patterns may be oblique to each side of the upper surface of the dielectric layer.

The upper surface of the patch antenna pattern may have a rectangular shape, and the first and second sides of the patch antenna pattern may be oblique to each side of the upper surface of the dielectric layer.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1A:
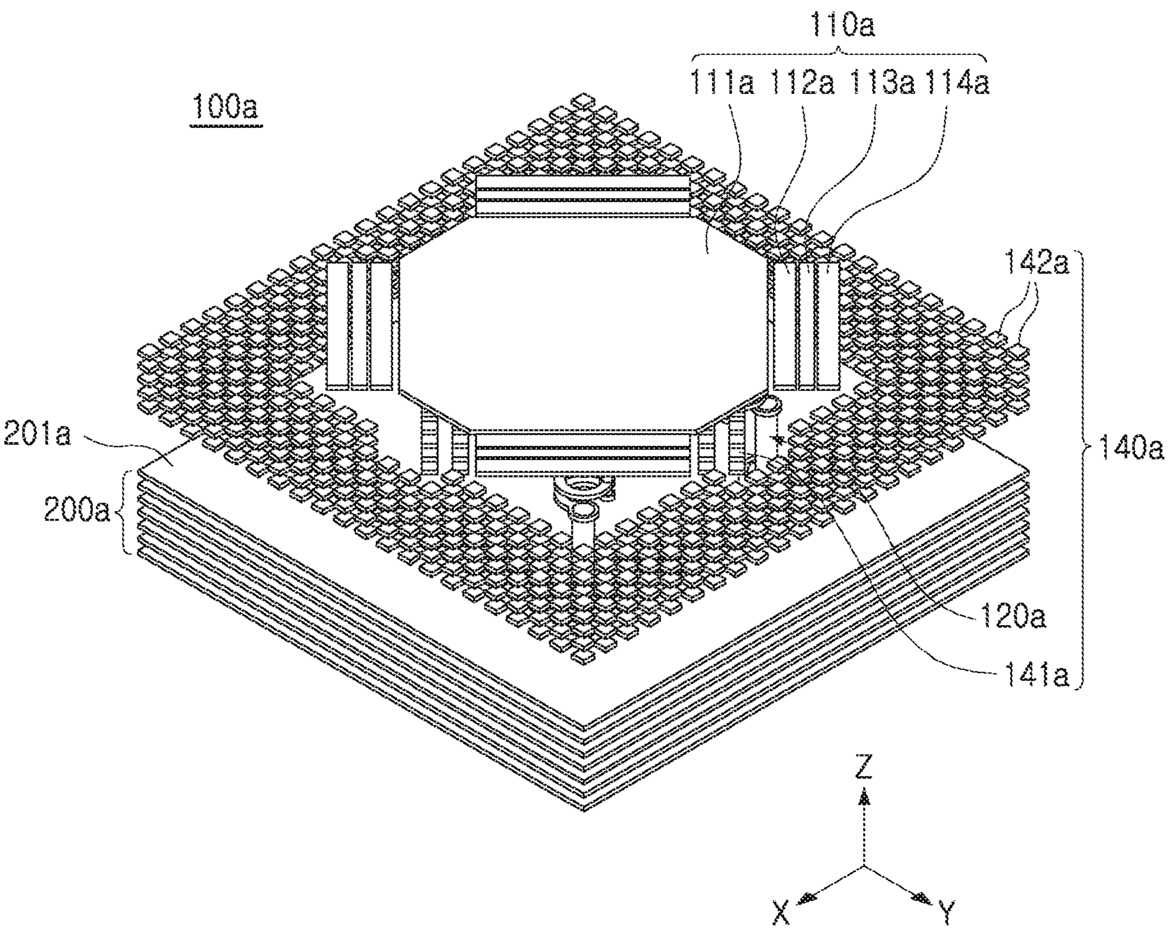
FIGS. 1A to 1F are perspective views illustrating antenna apparatuses according to embodiments of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein "portion" of an element may include the whole element or less than the whole element.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may be also be oriented in other ways (rotated degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of this disclosure. Further, although the examples described herein have a variety of configurations, other configurations are possible as will be apparent after an understanding of this disclosure.

Herein, it is noted that use of the term "may" with respect to an example, for example, as to what an example may include or implement, means that at least one example exists in which such a feature is included or implemented while all examples are not limited thereto.

An aspect of the present disclosure is to provide an antenna apparatus.

Figure 1B:
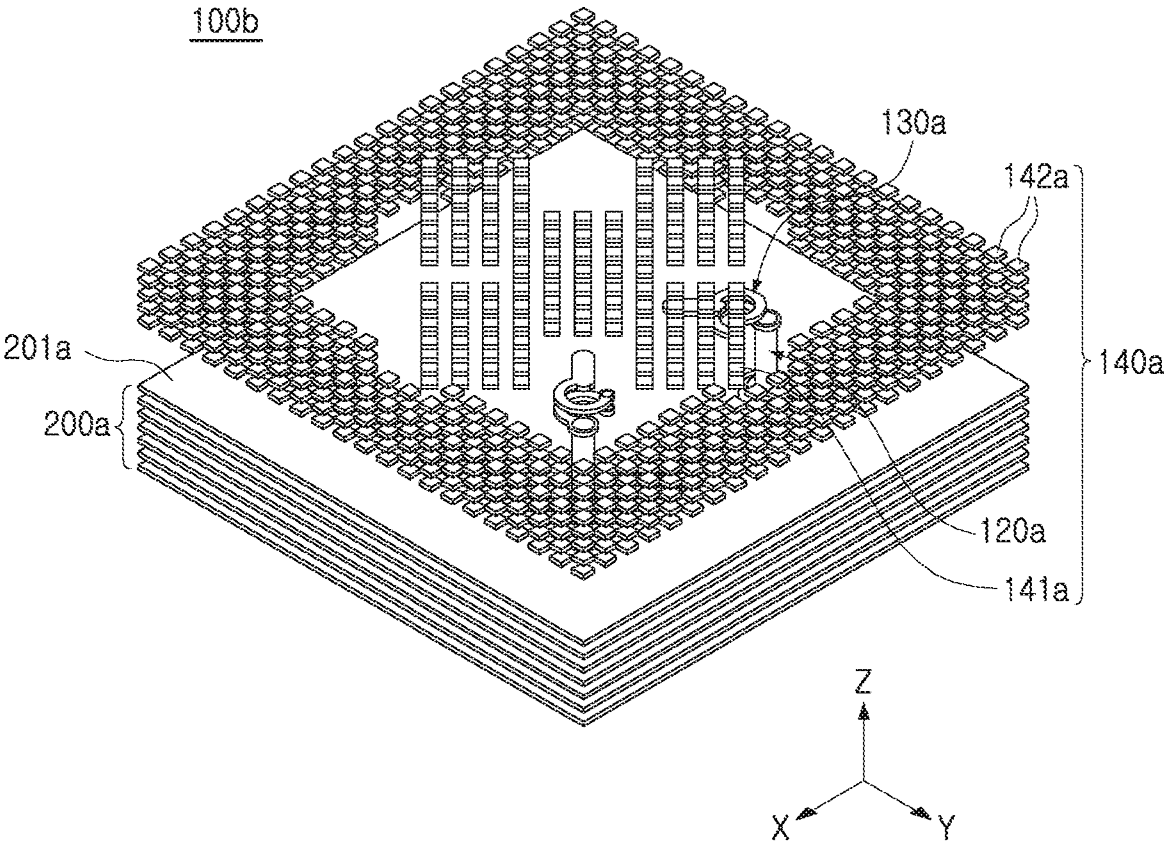
Figure 1C:
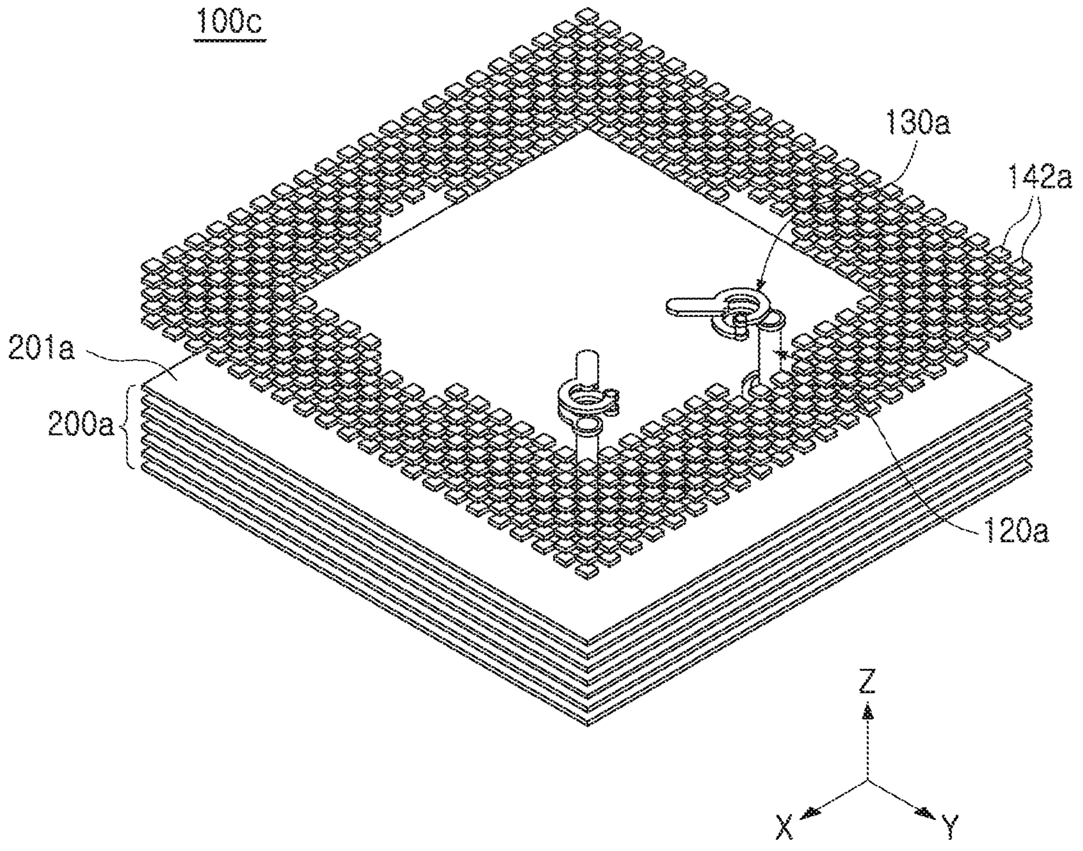
Figure 3A:
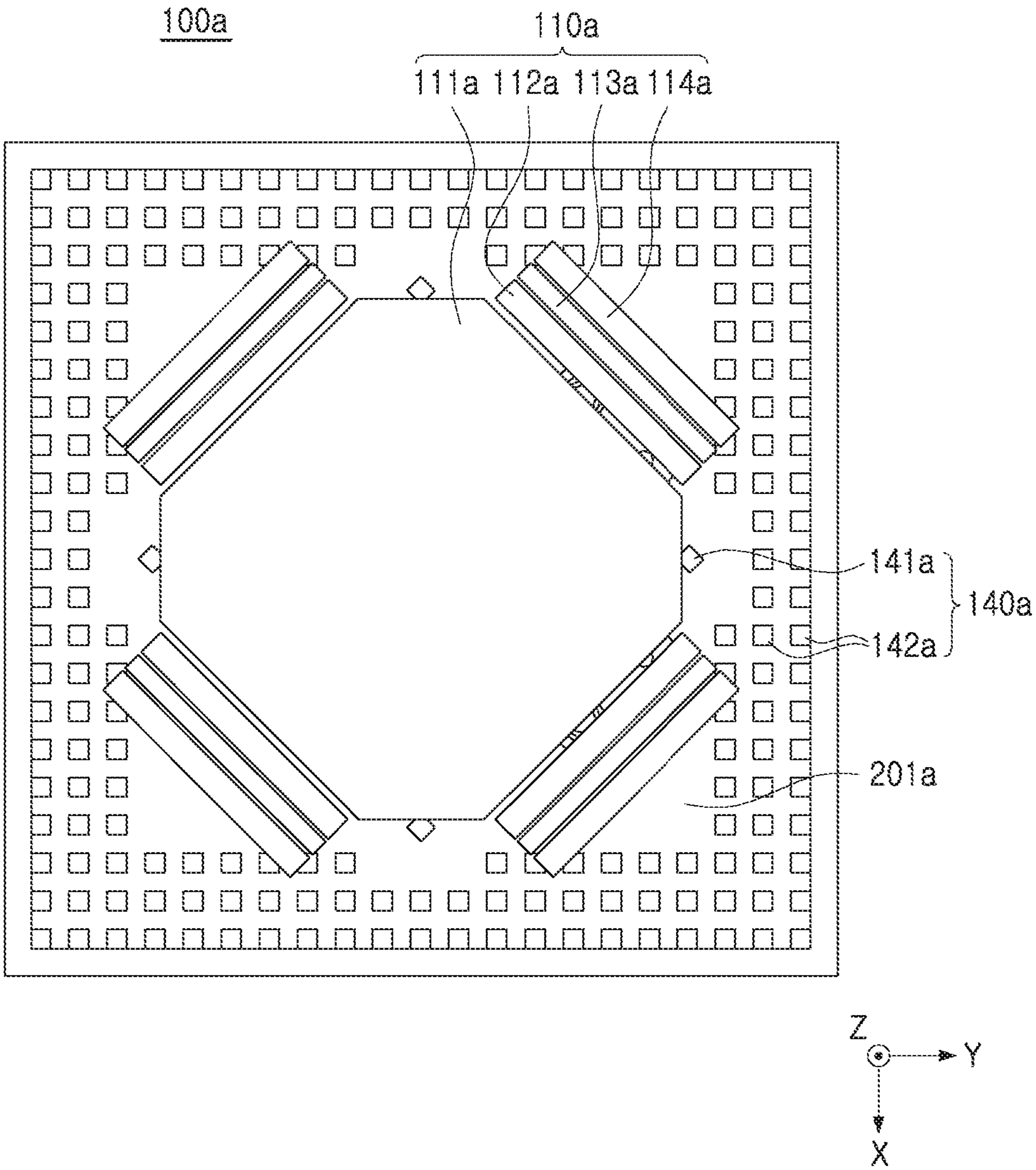
FIG. 3A is a plan view illustrating an antenna apparatus according to an embodiment of the present disclosure.
Figure 3B:
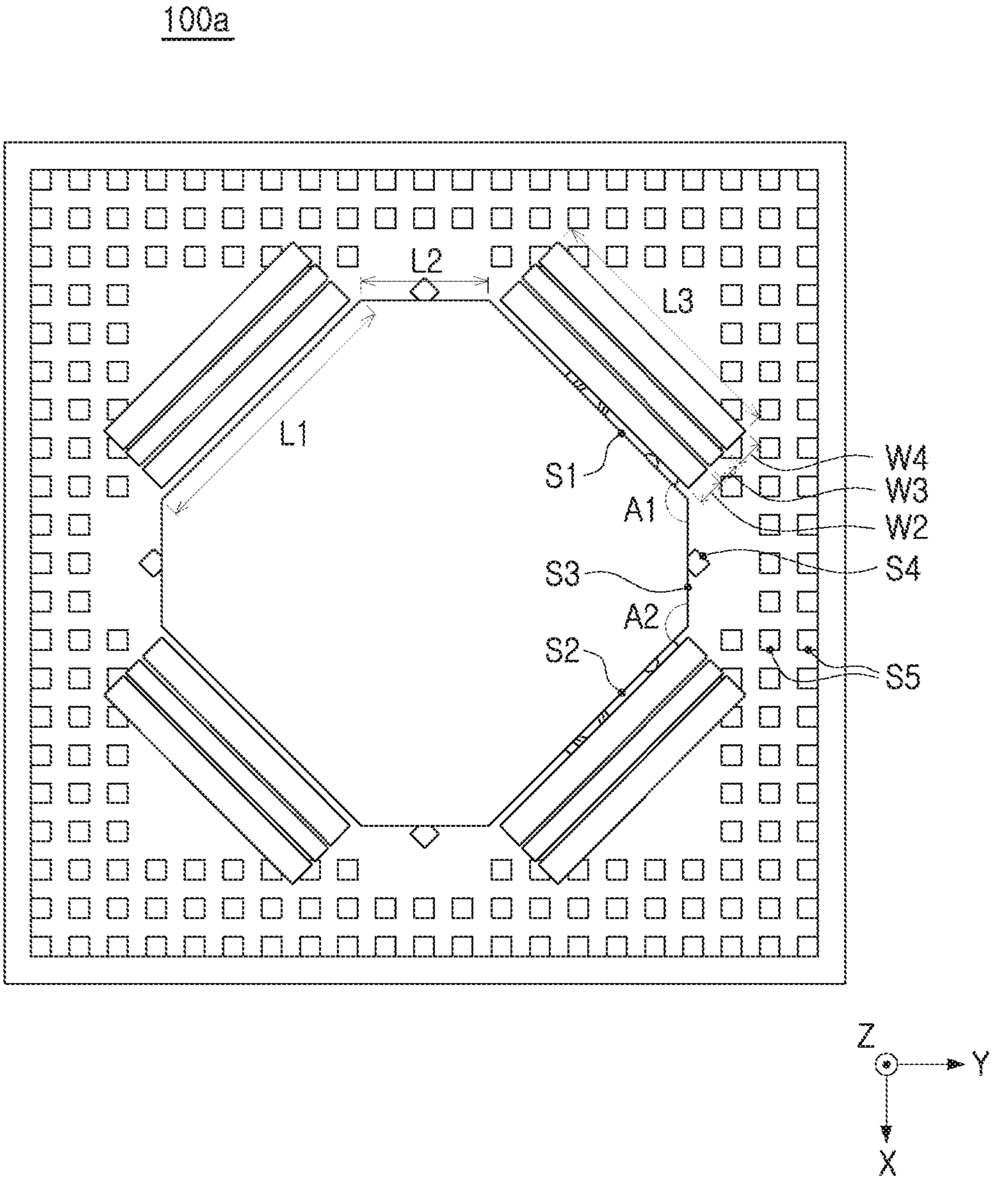
FIG. 3B is a plan view illustrating dimensions of an antenna apparatus according to an embodiment of the present disclosure.
Figure 3C:
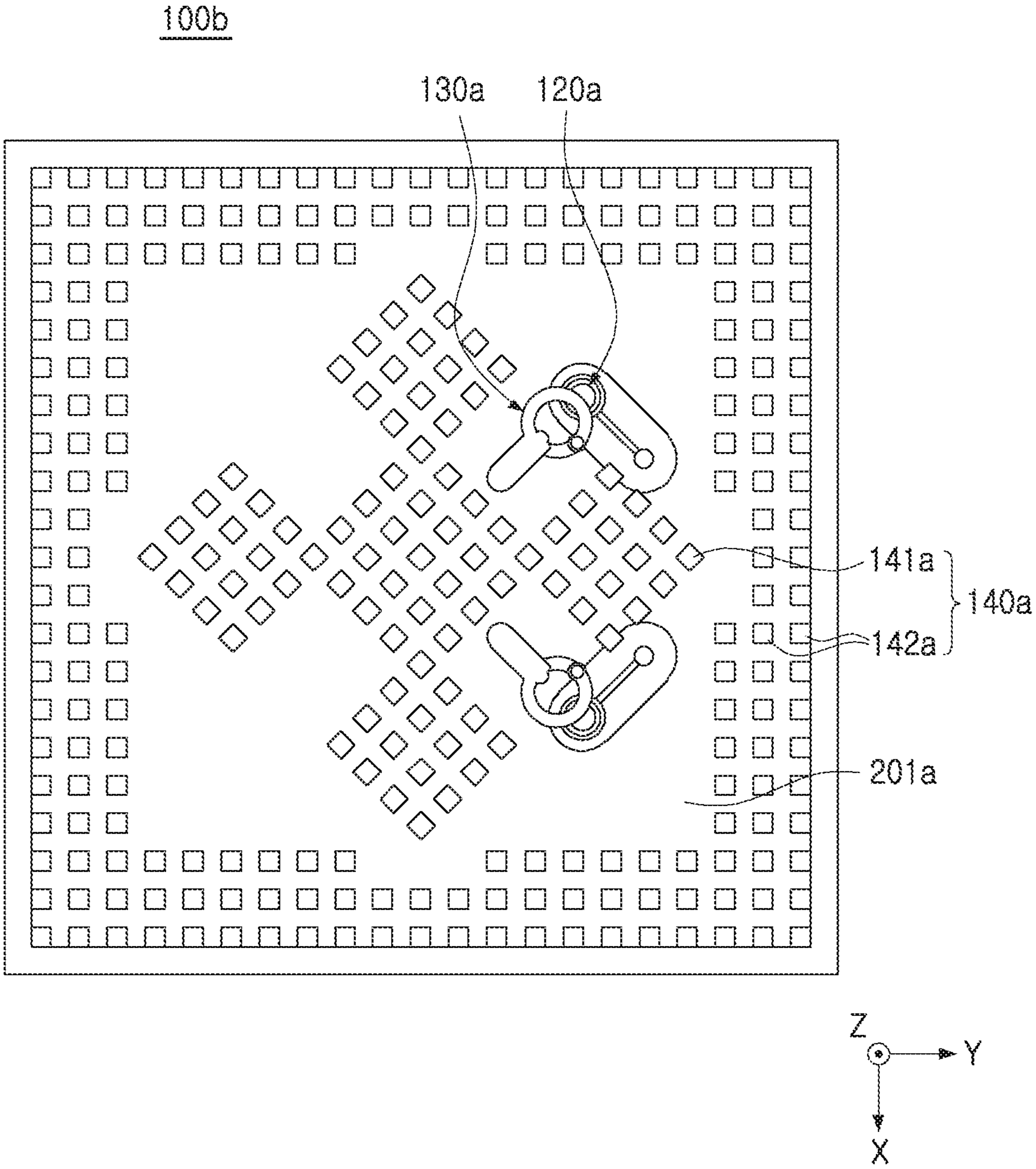
FIG. 3C is a plan view illustrating a structure in which a patch antenna pattern is omitted in an antenna apparatus according to an embodiment of the present disclosure.

FIG. 1A is a perspective view illustrating an antenna apparatus according to an embodiment of the present disclosure, FIG. 1B is a perspective view illustrating a structure in which a patch antenna pattern is omitted in an antenna apparatus according to an embodiment of the present disclosure, FIG. 3A is a plan view illustrating an antenna apparatus according to an embodiment of the present disclosure, FIG. 3B is a plan view illustrating dimensions of an antenna apparatus according to an embodiment of the present disclosure, and FIG. 3C is a plan view illustrating a structure in which a patch antenna pattern is omitted in an antenna apparatus according to an embodiment of the present disclosure.

Referring to FIGS. 1A and 3A, an antenna apparatus 100*a* according to an embodiment of the present disclosure may include a patch antenna 110*a* and a feed via 120*a*, and may further include at least one of a plurality of dummy patterns 140*a*, a connection member 200*a*, and a ground plane 201*a*. The patch antenna 110*a* may include a patch antenna pattern 111*a*, and may further include at least one of a first extended patch antenna pattern 112*a*, a second extended patch antenna pattern 114*a*, and a third extended patch antenna pattern 113*a*.

Referring to FIGS. 1B and 3C, an antenna apparatus 100*b* according to an embodiment of the present disclosure may include a feed pattern 130*a*, and may further include at least one of a plurality of dummy patterns 140*a*, a connection member 200*a*, and a ground plane 201*a*.

A patch antenna pattern 111*a* may be disposed on an upper surface of the ground plane 201*a*. The patch antenna pattern 111*a* may be configured to have a main resonant frequency, and may remotely transmit or remotely receive a radio frequency (RF) signal, close to the main resonant frequency.

When the RF signal is remotely transmitted and received, most of a surface current corresponding to the RF signal may flow through an upper surface and a lower surface of the patch antenna pattern 111*a*. The surface current may form an electric field in a first horizontal direction that may be the same as a direction of the surface current, and may form a magnetic field in a second horizontal direction, perpendicular to the direction of the surface current. Most of the RF signals may propagate through air or dielectric layers in a vertical direction (e.g., a z direction), perpendicular to the first and second horizontal directions.

Therefore, a radiation pattern of the patch antenna pattern 111*a* may be intensively formed in a normal direction (e.g., the z direction) of the upper and lower surfaces of the patch antenna pattern 111*a*. Gain of the patch antenna pattern 111*a* may be improved, as concentration of the radiation pattern of the patch antenna pattern 111*a* increases.

Since the ground plane 201*a* may reflect the RF signal to support the concentration of the radiation pattern of the patch antenna pattern 111*a*, the gain of the patch antenna pattern 111*a* may further increase, and may support formation of impedance corresponding to the main resonant frequency of the patch antenna pattern 111*a*.

The surface current flowing in the patch antenna pattern 111*a* may be formed based on a feed path provided to the patch antenna pattern 111*a*. The feed path may extend from the patch antenna pattern 111*a* to an integrated circuit (IC), and may be a transmission path of the RF signal. The IC may perform at least one of amplification, frequency conversion, phase control, and filtering on a received RF signal, or may perform at least one of amplification, frequency conversion, phase control, and filtering on the received RF signal, to generate an RF signal to be transmitted.

A feed via 120$a$ may provide a feed path to the patch antenna pattern 111$a$. The feed via 120$a$ may be disposed to penetrate the ground plane 201$a$ and/or a dielectric layer, and may be spaced apart from a patch antenna pattern 111$a$.

For example, the feed via 120$a$ may be disposed so as not to contact the patch antenna pattern 111$a$. Therefore, since a portion of the feed via 120$a$, close to the patch antenna pattern 111$a$, may be designed more freely, additional impedance may be provided by the patch antenna pattern 111$a$ At least one additional resonant frequency, corresponding to the additional impedance, may widen a bandwidth of the patch antenna pattern 111$a$ to be passed. A width of the bandwidth may be determined, based on appropriateness of a difference in frequency between the at least one additional resonant frequency and the main resonant frequency, and the number of additional resonance frequencies, close to the main resonant frequency, among the at least one additional resonance frequency.

As a degree of freedom in design of the portion of the feed via 120$a$, close to the patch antenna pattern 111$a$, increases, the appropriateness and/or number of the at least one additional resonant frequency may be improved more efficiently.

Therefore, the feed via 120$a$ may provide a non-contact feed path to the patch antenna pattern 111$a$, to improve the bandwidth of the patch antenna pattern 111$a$ more efficiently.

The feed pattern 130$a$ may be electrically connected to an upper end of the feed via 120$a$, may be spaced apart from the patch antenna pattern 111$a$, and may provide a feed path to the patch antenna pattern 111$a$.

For example, the feed via 120$a$ may use a relatively high degree of freedom in design of the portion of the feed via 120$a$, close to the patch antenna pattern 111$a$, to have an arrangement space of the feed pattern 130$a$.

The feed pattern 130$a$ may be provided as a plurality of feed patterns 130$a$ spaced apart from each other.

The feed via 120$a$ may be provided as a plurality of feed vias 120$a$, which may be respectively disposed to be biased toward a first side and a second side, different from each other, from a center of a polygonal shape of the patch antenna pattern 111$a$, and respectively disposed to be spaced apart from the patch antenna pattern 111$a$. The plurality of feed vias 120$a$ may be electrically connected to the plurality of feed patterns 130$a$.

Therefore, a first surface current formed based on one feed via of the plurality of feed vias 120$a$, and a second surface current formed based on the other one feed via of the plurality of feed vias 120$a$ may flow on the upper and lower surfaces of the patch antenna pattern 111$a$ in different first and second horizontal directions.

Since the first and second horizontal directions are different from each other, at least a portion of a first RF signal propagated based on the first surface current, and at least a portion of a second RF signal propagated based on the second surface current may be orthogonal to each other, and the patch antenna pattern 111$a$ may remotely transmit and/or receive the first and second RF signals together.

The higher the orthogonality between the first and second RF signals, the higher the overall gain of the patch antenna pattern 111$a$ for the first and second RF signals.

Since the plurality of feed vias 120$a$ and the plurality of feed patterns 130$a$ are respectively spaced apart from the patch antenna pattern 111$a$, influence on each other in providing the feed paths of the plurality of feed patterns 130$a$ for the patch antenna patterns 111$a$ may serve as a design factor for improving orthogonality between the first and second RF signals.

For example, the lower the influence on each other in providing the feed paths of the plurality of feed patterns 130$a$ for the patch antenna patterns 111$a$, the higher orthogonality between the first and second RF signals.

First, referring to FIGS. 1A and 3B, the polygonal shape of the patch antenna pattern 111$a$ may have a structure in which a first side (S1) and a second side (S2), different from each other, and a third side (S3) connecting the different first and second sides (S1 and S2) form a plurality of obtuse angles (A1 and A2).

Sides of the polygonal shape of the patch antenna pattern 111$a$ may cause an increase in a z direction vector component of the electric and/or magnetic fields due to a fringing phenomenon, and vertices of the polygonal shape of the patch antenna pattern 111$a$ may serve as a point in which a first horizontal vector component of the first RF signal based on the one feed via of the plurality of feed vias 120$a$, and a second horizontal vector component of the second RF signal based on the other one feed via of the plurality of feed vias 120$a$ meet. Therefore, the vertices may act as interference elements of the first and second RF signals to each other.

Since a first vertex corresponding to the first horizontal direction vector component, and a second vertex corresponding to the second horizontal direction vector component may be arranged to be spaced apart from each other by the third side (S3) of the patch antenna pattern 111$a$, connecting the different first and second sides (S1 and S2), the interference elements of the first and second RF signals with respect to each other may be reduced, to increase the overall gain of the patch antenna pattern 111$a$ for the first and second RF signals.

In addition, since the plurality of obtuse angles (A1 and A2) formed by the different first and second sides (S1 and S2) and the third side (S3) connecting the different first and second sides (S1 and S2) may be closer to 180 degrees, not perpendicular to each other, the first and second horizontal vector components may be reduced, to further increase the overall gain of the patch antenna pattern 111$a$ for the first and second RF signals.

For example, at least a portion of the patch antenna pattern 111$a$ may have an octagonal shape. Therefore, since a structure including the plurality of obtuse angles (A1 and A2) formed by the different first and second sides (S1 and S2) and the third side (S3) connecting the different first and second sides (S1 and S2) may be more easily implemented, may easily provide an electromagnetic design element according to control of angles of the plurality of obtuse angles (A1 and A2), and may easily provide an electromagnetic design element according to control of a length of each of the different first and second sides (S1 and S2) and the third side (S3) connecting the different first and second sides (S1 and S2), antenna performance (e.g., gain, bandwidth, etc.) of the patch antenna pattern 111$a$ may be improved efficiently, compared to a size of the patch antenna pattern 111$a$.

For example, a length (L2) of the third side (S3) of the patch antenna pattern 111$a$, connecting the different first and second sides (S1 and S2), may be shorter than a length (L1) of each of the different first and second sides (S1 and S2).

Therefore, an optimal feeding position for matching the impedance of a feed path of the patch antenna pattern 111*a* may be further biased to the different first and second sides (S1 and S2) from the center of the patch antenna pattern 111*a*. Therefore, positions of the plurality of feed vias 120*a* may be further biased to the different first and second sides (S1 and S2) from the center of the patch antenna patterns 111*a*, a distance between the plurality of feed patterns 130*a* may be longer, electromagnetic isolation between the plurality of feed patterns 130*a* may be higher, orthogonality between the first and second RF signals may be further improved, and overall gain of the patch antenna patterns 111*a* for the first and second RF signals may be further improved.

For example, when a length of each of the different first and second sides (S1 and S2) is longer than a length of the third side (S3) connecting the different first and second sides (S1 and S2), the different first and second sides (S1 and S2) may be oblique (for example, an angle difference of 45 degrees) to each side of an upper surface of the ground plane 201*a* or an upper surface of a dielectric layer.

A plurality of antenna apparatuses may be arranged parallel to each side of the upper surface of the ground plane 201*a* or the upper surface of the dielectric layer, the surface current may flow in a direction of the plurality of feed vias 120*a*, biased from the center of the patch antenna patterns 111*a*. When the different first and second sides (S1 and S2) are oblique to each side of the upper surface of the ground plane 201*a* or the upper surface of the dielectric layer, the direction of the surface current of the patch antenna pattern 111*a* may be different from a direction facing an adjacent antenna apparatus. Therefore, electromagnetic isolation between the plurality of antenna apparatuses may be further improved, and overall gain and/or directivity of the plurality of antenna apparatuses may be further improved.

Second, referring to FIGS. 1B and 3C, the antenna apparatuses 100*a* and 100*b* according to an embodiment of the present disclosure may further include a plurality of first dummy patterns 141*a* respectively having a polygonal shape and arranged three-dimensionally between a plurality of spaces between the patch antenna pattern 111*a* and the plurality of feed patterns 130*a*.

The plurality of spaces between the patch antenna pattern 111*a* and the plurality of feed patterns 130*a* may serve as a feed path of the plurality of feed patterns 130*a*.

Since the plurality of first dummy patterns 141*a* are arranged three-dimensionally between the plurality of spaces, concentration of feeding of each of the plurality of feed patterns 130*a* for the patch antenna patterns 111*a* may be further increased.

In addition, since the plurality of first dummy patterns 141*a* may not substantially affect formation of radiation pattern of the patch antenna pattern 111*a*, concentration of feeding of each of the plurality of feed patterns 130*a* may increase without adversely affecting the gain of the patch antenna pattern 111*a*.

Therefore, orthogonality between the first and second RF signals may be further improved, and overall gain of the patch antenna pattern 111*a* for the first and second RF signals may be further increased.

For example, an effective distance between the patch antenna pattern 111*a* and the ground plane 201*a* may affect the radiation pattern of the patch antenna pattern 111*a*, and the plurality of first dummy patterns 141*a* may not have a substantial effect on the effective distance.

The antenna apparatus 100*a* according to an embodiment of the present disclosure may further include a plurality of second dummy patterns 142*a* respectively having a polygonal shape and arranged three-dimensionally to surround a space in which the plurality of first dummy patterns 141*a* are arranged.

The plurality of spaces between the patch antenna pattern 111*a* and the plurality of feed patterns 130*a* may be surrounded by the plurality of first and second dummy patterns 141*a* and 142*a*.

Therefore, concentration of feeding of the plurality of feed patterns 130*a* may be further increased, orthogonality between the first and second RF signals may be further improved, and overall gain of the patch antenna pattern 111*a* for the first and second RF signals may be further increased.

For example, each of the plurality of first dummy patterns 141*a* may be disposed to have a side (S4) that is oblique (for example, an angle difference of 45 degrees) to each side (S5) of the plurality of second dummy patterns 142*a*.

Therefore, the plurality of first dummy patterns 141*a* may be arranged in a direction biased to the plurality of feed patterns 130*a* from the center of the patch antenna pattern 111*a*, and the plurality of second dummy patterns 142*a* may be arranged in a direction, parallel or perpendicular to a direction of each side of the upper surface of the ground plane 201*a* or the upper surface of the dielectric layer. Therefore, since the plurality of spaces between the patch antenna pattern 111*a* and the plurality of feed patterns 130*a* may have a relatively long length in a direction in which the plurality of feed vias 120*a* are biased from the center of the patch antenna pattern 111*a*, electromagnetic design elements may be easily provided according to control of the position of the plurality of feed vias 120*a*. In addition, since a control range of the position of the plurality of feed vias 120*a* may be further widened, antenna performance (e.g., gain, bandwidth, etc.) of the patch antenna pattern 111*a* may be improved efficiently, compared to a size of the patch antenna pattern 111*a*.

Third, at least a portion of the plurality of feed patterns 130*a* may be disposed to overlap a corresponding extended patch antenna pattern, among the plurality of extended patch antenna patterns 112*a* and 114*a*, in a vertical direction, and may be coiled.

First and second coiling currents, corresponding to first and second RF signals transmitted through the plurality of feed patterns 130*a*, may flow through the plurality of feed patterns 130*a*. The first and second coiling currents may rotate corresponding to a coiling direction of a coiled portion of each of the plurality of feed patterns 130*a*.

Therefore, since self-inductance of the plurality of feed patterns 130*a* may be boosted, the plurality of feed patterns 130*a* may have relatively large inductance.

The plurality of feed patterns 130*a* may have relatively high impedance, compared to a size of the plurality of feed patterns 130*a*. In addition, even when an area of the plurality of feed patterns 130*a* overlapping the patch antenna pattern 111*a* in the vertical direction is relatively small, the plurality of feed patterns 130*a* may have sufficient impedance.

Therefore, a distance between the plurality of feed patterns 130*a* may be more easily lengthened, concentration of feeding of each of the plurality of feed patterns 130*a* may be increased, and overall gain of the patch antenna pattern 111*a* for the first and second RF signals may be further increased.

Each of the plurality of first and second extended patch antenna patterns 112*a* and 114*a* may be disposed to be spaced apart from the plurality of feed patterns 130*a*, may be disposed to be biased toward different first and second sides from the center of the polygonal shape of the patch antenna pattern 111*a*, and may be disposed to be spaced apart from the patch antenna pattern 111*a*.

Since the plurality of first and second extended patch antenna patterns 112*a* and 114*a* may form additional impedance together with the patch antenna pattern 111*a*, a bandwidth of the patch antenna pattern 111*a* may be widened.

In this case, the plurality of feed patterns 130*a* may be arranged to overlap at least one of corresponding first and second extended patch antenna patterns, among the plurality of first and second extended patch antenna patterns 112*a* and 114*a*.

Therefore, a distance between the plurality of feed patterns 130*a* below the patch antenna pattern 111*a* may be more easily lengthened, concentration of feeding of each of the plurality of feed patterns 130*a* may be increased, and overall gain of the patch antenna pattern 111*a* for the first and second RF signals may be further increased.

For example, the plurality of feed patterns 130*a* may be arranged such that different first and second sides (S1 and S2) of the patch antenna pattern 111*a* overlap the plurality of feed patterns 130*a* in the vertical direction.

Therefore, since concentration of feeding of the plurality of feed patterns 130*a* may be further increased, and a control range of capacitance formed by the plurality of feed patterns 130*a* and the patch antenna 110*a* may be further widened, the patch antenna 110*a* may have a wider bandwidth.

For example, the number of each of the plurality of first, second, and third extended patch antenna patterns 112*a*, 114*a*, and 113*a* may be less than eight. The number of each of the plurality of first, second, and third extended patch antenna patterns 112*a*, 114*a*, and 113*a* may be less than the number of sides of the patch antenna pattern 111*a*. The plurality of first, second, and third extended patch antenna patterns 112*a*, 114*a*, and 113*a* may be arranged to be more concentrated in a direction in which the plurality of feed vias 120*a* are biased from the center of the patch antenna pattern 111*a*. Therefore, concentration of feeding of the plurality of feed patterns 130*a* for the patch antennas 110*a* may be further increased.

For example, referring to FIG. 3B, each of the plurality of first, second, and third extended patch antenna patterns 112*a*, 114*a*, and 113*a* may have a width shorter than a length (L3), and a width (W2) of the first extended patch antenna pattern 112*a*, a width (W3) of the second extended patch antenna pattern 114*a*, and a width (W4) of the third extended patch antenna pattern 113*a* may all be different from each other. Therefore, since diversity in control of capacitance formed by the plurality of feed patterns 130*a* and the patch antenna 110*a* may be further increased, a bandwidth of the patch antenna 110*a* may be more easily improved.

For example, directions of the length (L3) and the widths (W2, W3, and W4) of the plurality of first, second, and third extended patch antenna patterns 112*a*, 114*a*, and 113*a* may be oblique (for example, an angle difference of 45 degrees) to each side of the upper surface of the ground plane 201*a*, or the upper surface of the dielectric layer. Therefore, since an arrangement space of the plurality of first, second, and third extended patch antenna patterns 112*a*, 114*a*, and 113*a* may be sufficient, the plurality of first, second, and third extended patch antenna patterns 112*a*, 114*a*, and 113*a* may be designed more freely, and the bandwidth of the patch antenna 110*a* may be improved more easily.

Figure 1D:
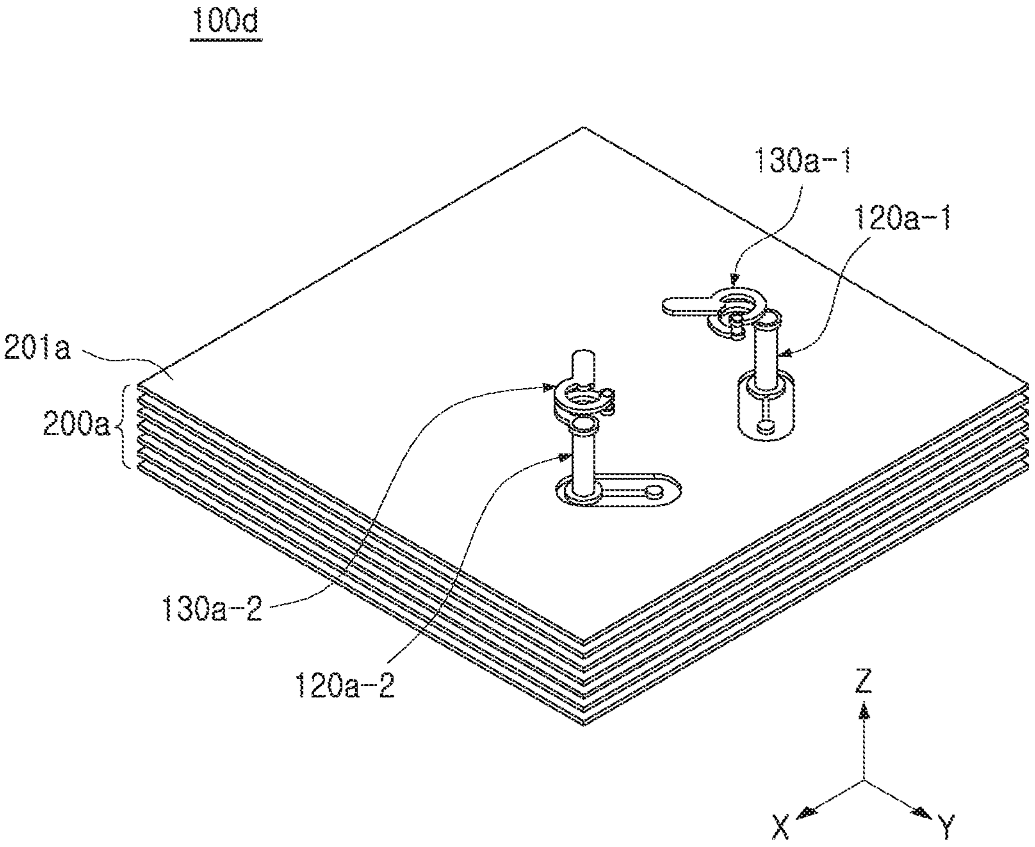
Figure 1E:
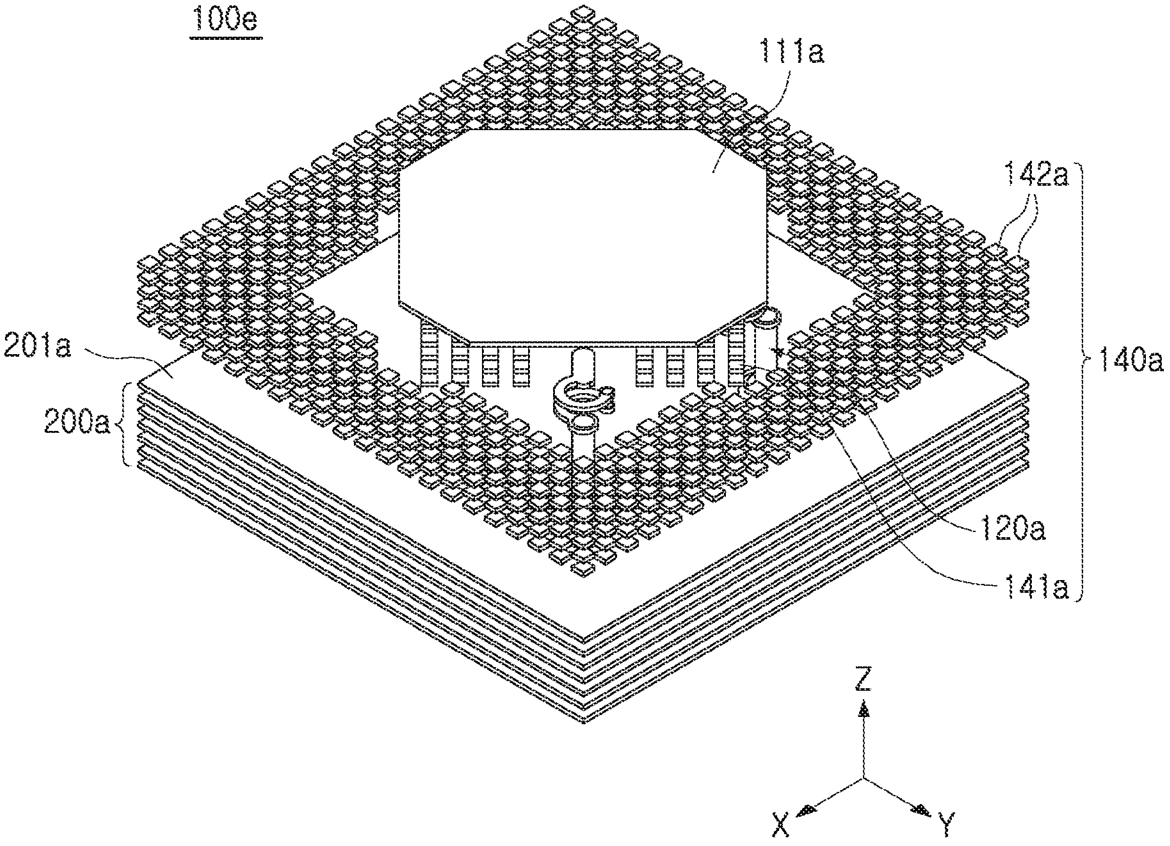
Figure 2A:
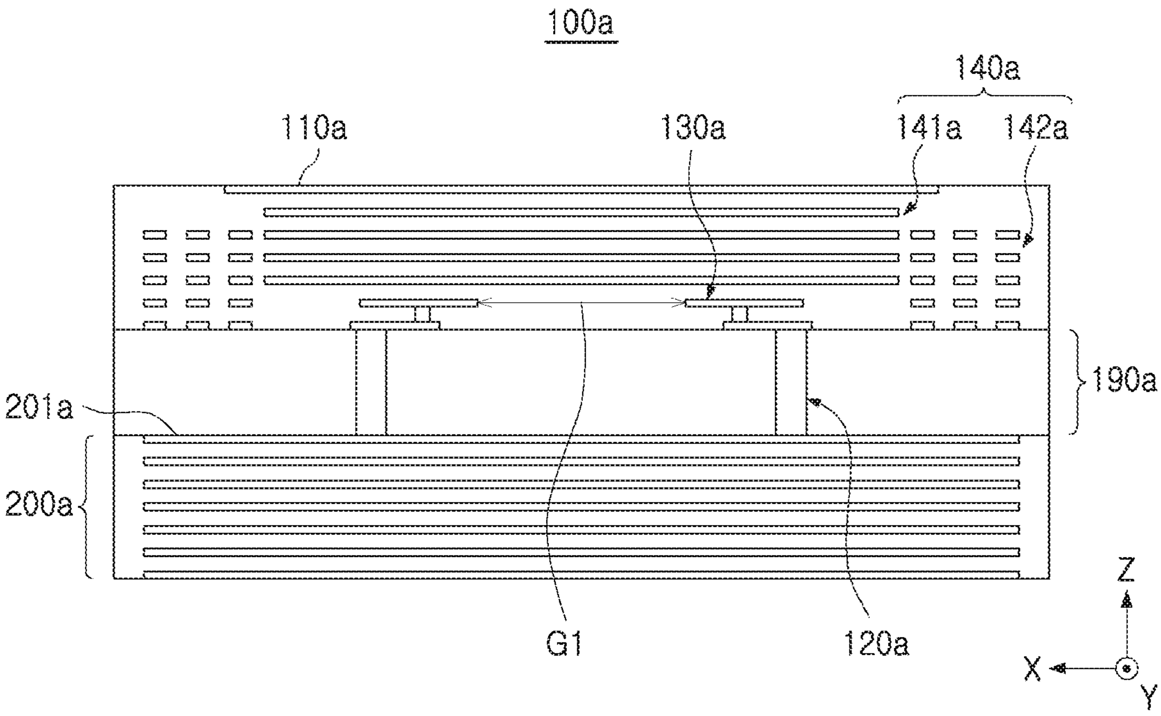
FIGS. 2A to 2C are cross-sectional views illustrating antenna apparatuses according to embodiments of the present disclosure.
Figure 2B:
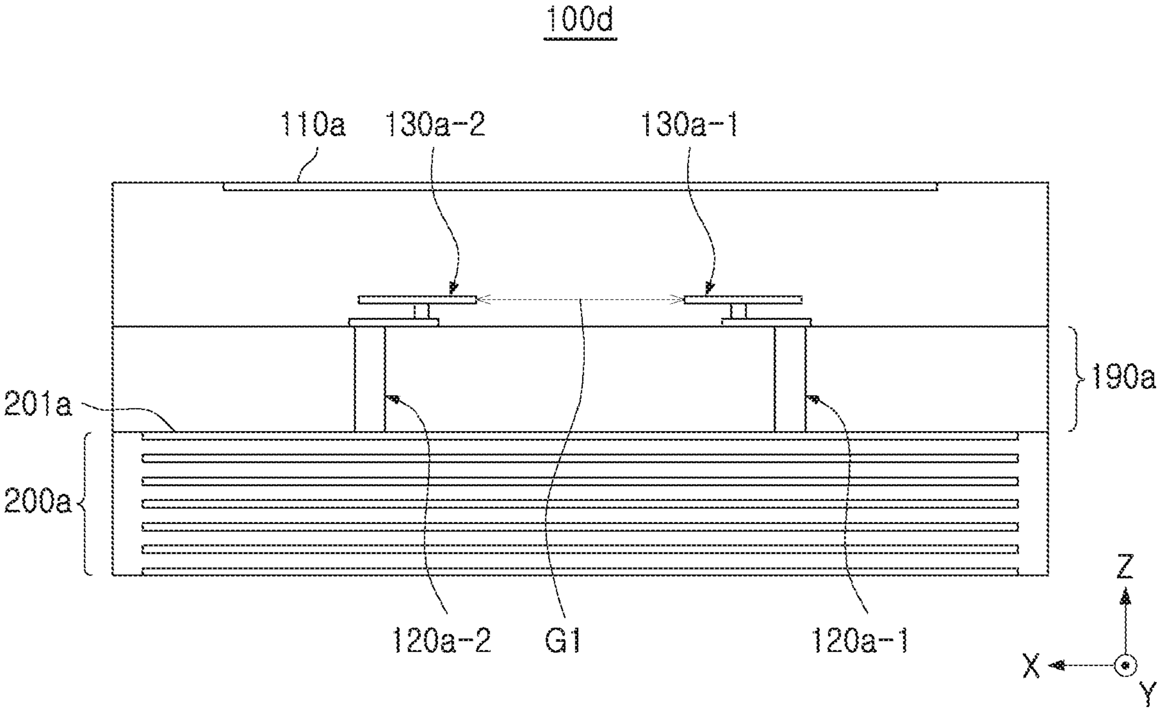
Figure 3D:
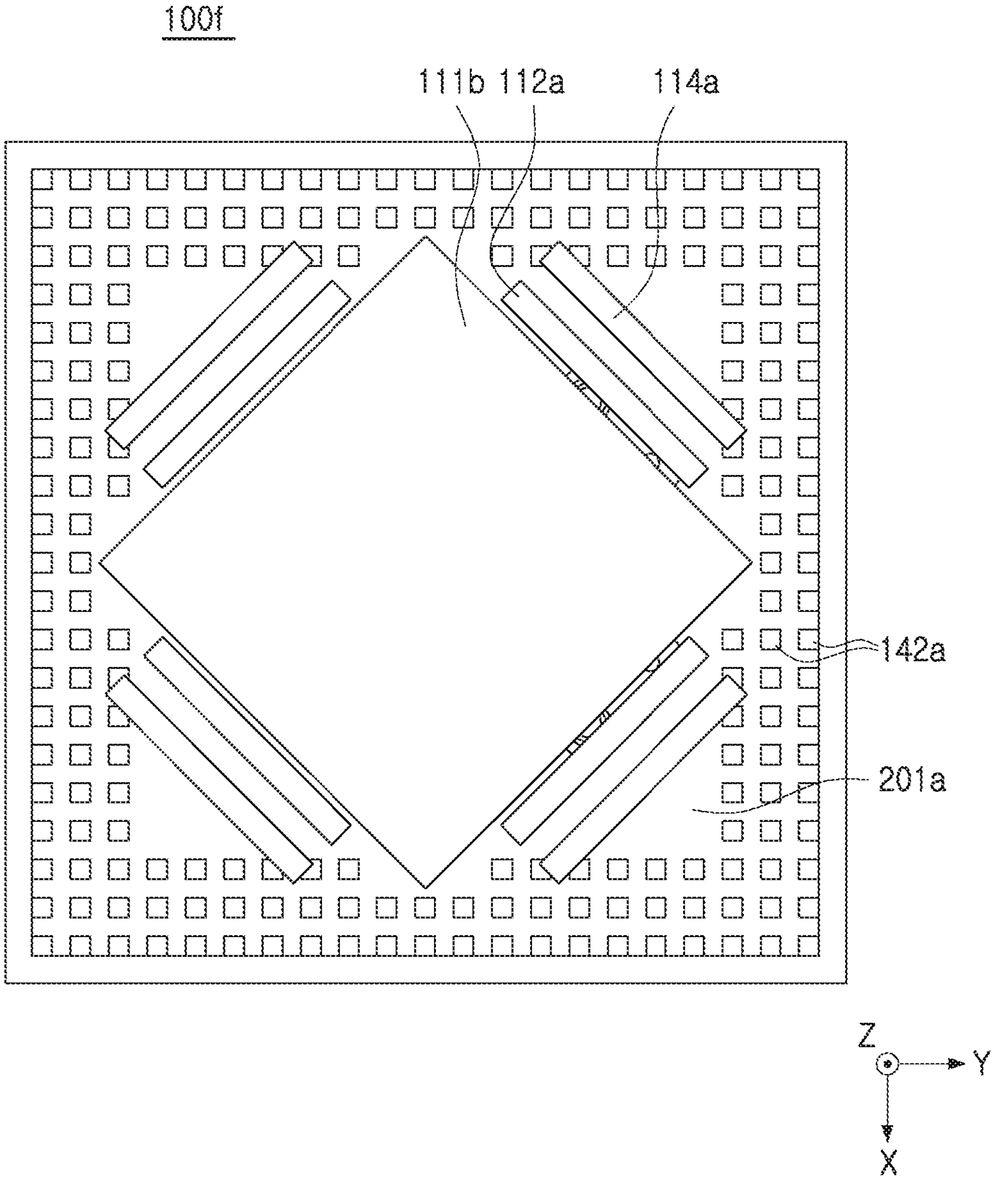
FIG. 3D is a plan view illustrating a modified structure of a patch antenna pattern of an antenna apparatus according to an embodiment of the present disclosure.

FIGS. 10 to 1E are perspective views illustrating antenna apparatuses according to embodiments of the present disclosure, FIG. 2B is a cross-sectional view illustrating an antenna apparatus according to an embodiment of the present disclosure, and FIG. 3D is a plan view illustrating an antenna apparatus according to an embodiment of the present disclosure.

Referring to FIG. 10, an antenna apparatus 100*c* according to an embodiment of the present disclosure may have a structure in which a plurality of first dummy patterns are omitted, and may have a structure in which a plurality of feed vias 120*a* and a plurality of feed patterns 130*a* efficiently provide a feed path to a patch antenna.

Referring to FIGS. 1D and 2B, an antenna apparatus 100*d* according to an embodiment of the present disclosure may have a structure in which a plurality of second dummy patterns are further omitted, may have a structure in which a plurality of feed vias 120*a*-1 and 120*a*-2 and a plurality of feed patterns 130*a*-1 and 130*a*-2 efficiently provide a feed path to the patch antenna, and may have a structure in which the plurality of feed patterns 130*a*-1 and 130*a*-2 are arranged to be spaced apart from each other by a predesigned gap (G1).

Referring to FIG. 1E, an antenna apparatus 100*e* according to an embodiment of the present disclosure may have a structure in which a plurality of extended patch antenna patterns are omitted, and may have a structure in which a plurality of feed vias 120*a* and a plurality of feed patterns efficiently provide a feed path to a patch antenna pattern 111*a*.

Figure 1F:
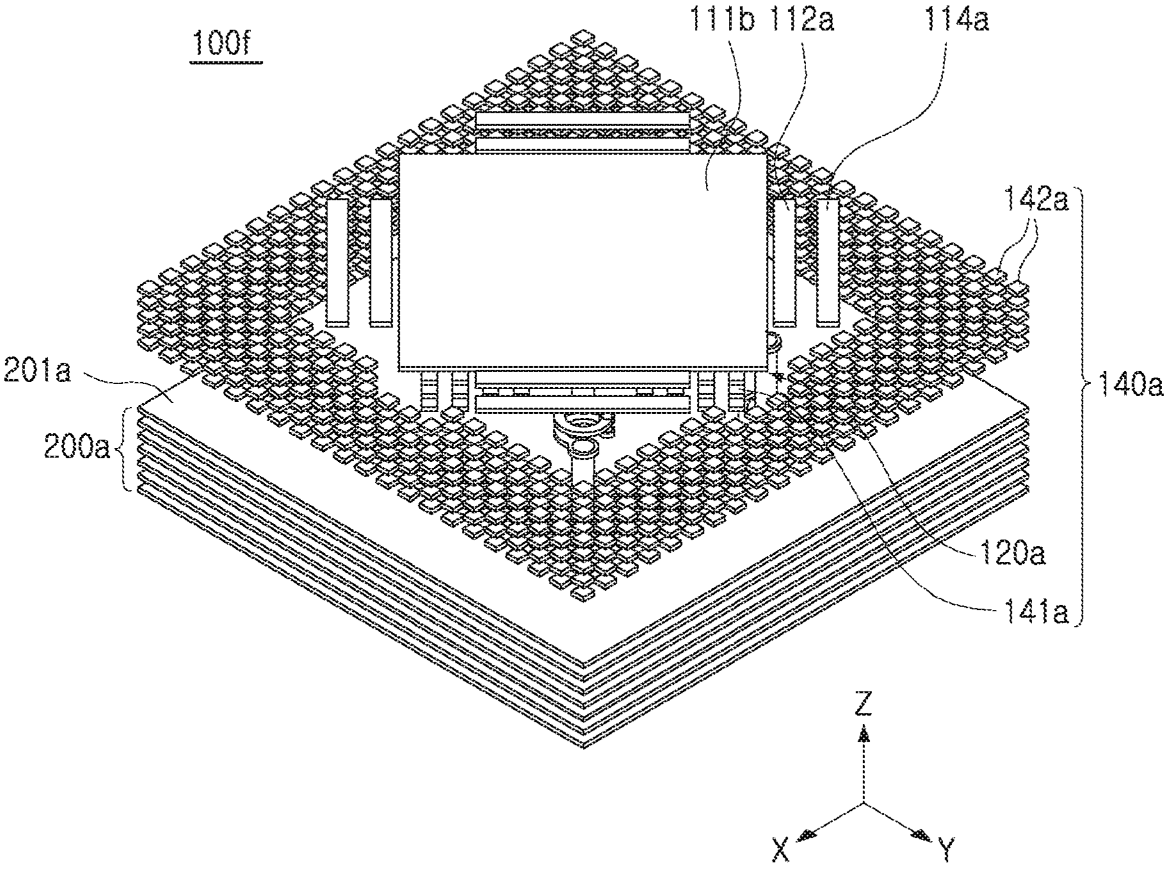

Referring to FIGS. 1F and 3D, an antenna apparatus 100*f* according to an embodiment of the present disclosure may have a structure in which a patch antenna pattern 111*b* having a rectangular shape may be included, and concentration of feeding thereof may be improved according to a plurality of first and second dummy patterns 141*a* and 142*a*, and may have a structure in which concentration of feeding thereof may be improved according to positions and/or shapes of the plurality of feed patterns.

Figure 2C:
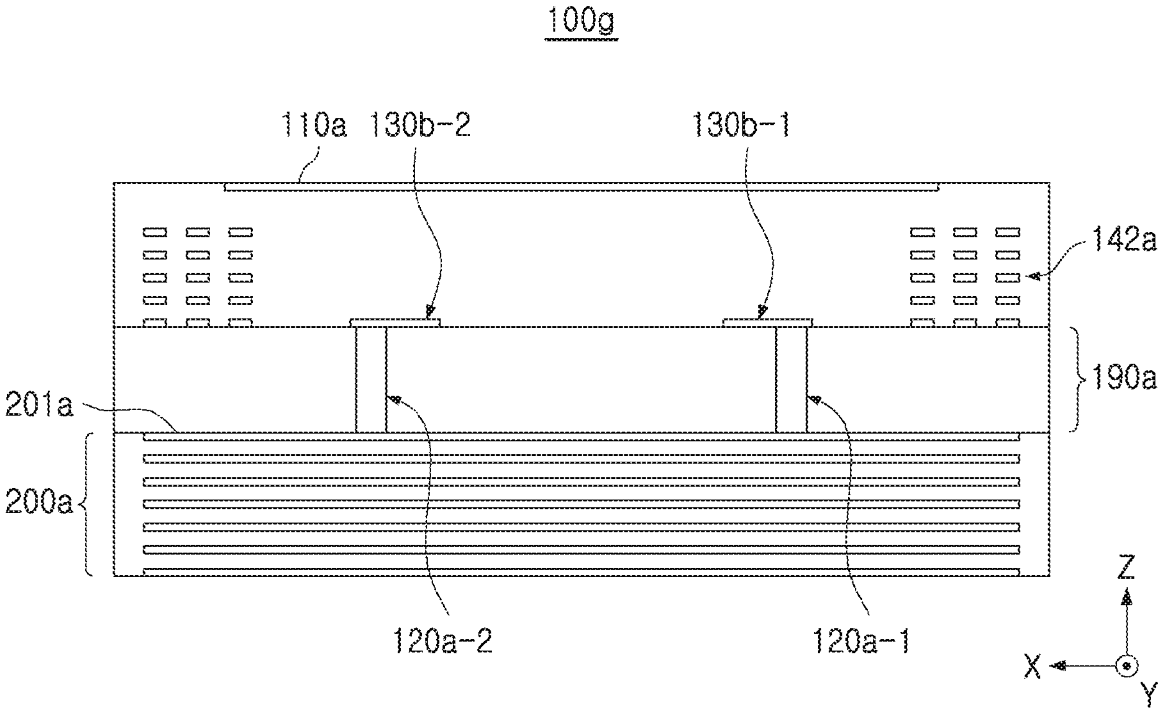

FIGS. 2A and 2C are cross-sectional views illustrating antenna apparatuses according to embodiments of the present disclosure.

Referring to FIG. 2A, a connection member 200*a* may be disposed below a dielectric layer 190*a*. A patch antenna 110*a*, a plurality of feed patterns 130*a*, and a plurality of dummy patterns 140*a* may be arranged on the dielectric layer 190*a*. A plurality of feed vias 120*a* may be disposed to penetrate the dielectric layer 190*a* by at least a portion of a thickness of the dielectric layer 190*a* in the vertical direction (e.g., the z direction).

For example, a plurality of insulating layers may be disposed on a level between the patch antenna 110*a*, the plurality of feed patterns 130*a*, and the plurality of dummy patterns 140*a* on the dielectric layer 190*a*, and may also be disposed below a ground plane 201*a* of the connection member 200*a*.

Conductive layers may be arranged on a portion of upper and/or lower surfaces of the plurality of insulating layers according to a predesigned pattern, and the predesigned pattern may be implemented with the patch antenna 110*a*, the plurality of feed patterns 130*a*, and the plurality of dummy patterns 140*a*. For example, the plurality of feed patterns 130*a* may be arranged on the portion of upper and/or lower surfaces of the plurality of insulating layers according to a predetermined gap (G1).

A via may extend in the vertical direction (e.g., the z direction) to penetrate the plurality of insulating layers, and may provide an electrical connection path between the plurality of insulating layers. The feed pattern 130*a* may have a three-dimensional structure by including the via.

For example, the via may be formed by filling a conductive material in a state from which a portion of the plurality of insulating layers is removed, and may be formed according to a method of forming the via in a conventional printed circuit board (PCB).

Referring to FIG. 2C, an antenna apparatus 100*g* according to an embodiment of the present disclosure may have a structure in which a plurality of feed patterns 130*b*-1 and 130*b*-2, not including a via, are included, and the plurality of feed patterns 130*b*-1 and 130*b*-2 efficiently provide a feed path to a patch antenna 110*a*.

Figure 4A:
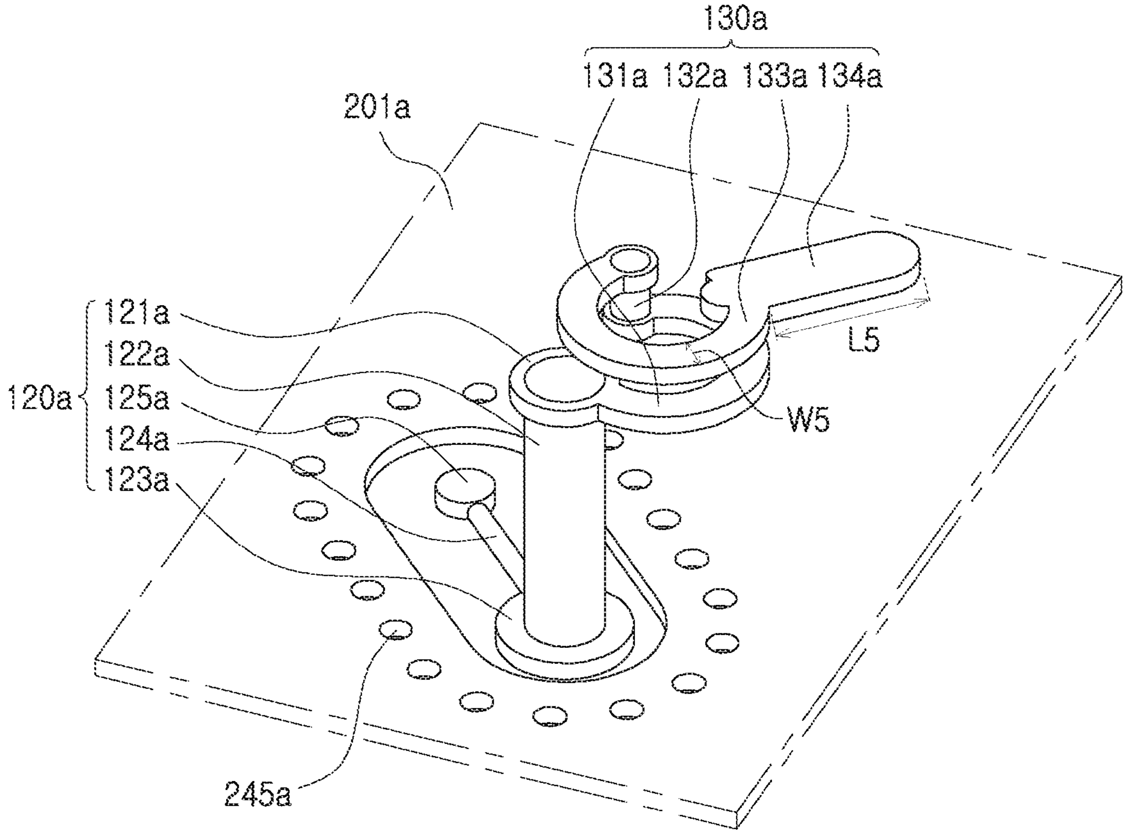
FIGS. 4A and 4B are perspective views illustrating feed patterns and feed vias of antenna apparatuses according to embodiments of the present disclosure.
Figure 4B:
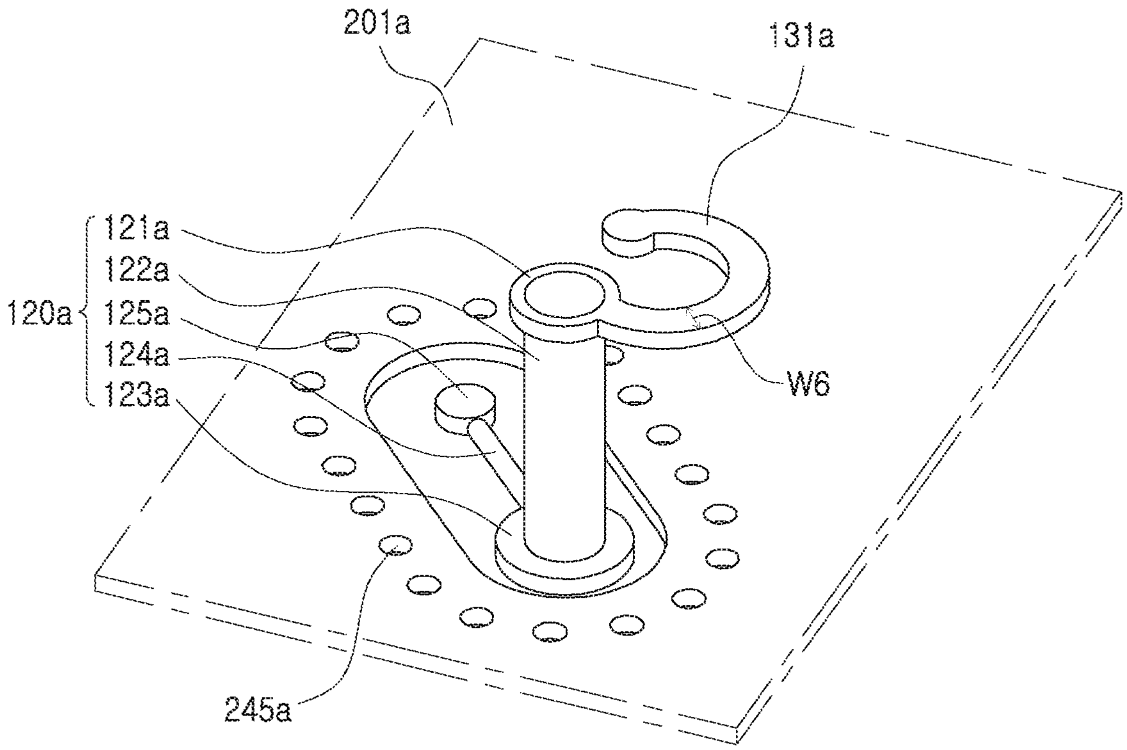

FIGS. 4A and 4B are perspective views illustrating feed patterns and feed vias of antenna apparatuses according to embodiments of the present disclosure.

Referring to FIG. 4A, a feed pattern 130*a* may include at least one of a first feed pattern 131*a*, an inductive via 132*a*, a second feed pattern 133*a*, and an extension portion 134*a*.

One end of the first feed pattern 131*a* may be disposed to be electrically connected to a feed via 120*a*, one end of the inductive via 132*a* may be disposed to be electrically connected to the other end of the first feed pattern 131*a*, and one end of the second feed pattern 133*a* may be disposed to be electrically connected to the other end of the inductive via 132*a* and at least partially overlap the first feed pattern 131*a* in the vertical direction.

Therefore, since the plurality of feed patterns 130*a* may have relatively high impedance, compared to a size of the plurality of feed patterns 130*a*, concentration of feeding of each of the plurality of feed patterns 130*a* may be further improved.

The extension portion 134*a* may be electrically connected to the other end of the second feed pattern 133*a*, and may extend toward a center of a patch antenna pattern by an extension length (L5). Since the extension length (L5) of the extension portion 134*a* and a width (W5) of the second feed pattern 133*a* may affect impedance of the feed pattern 130*a*, it may serve as a bandwidth design element of a patch antenna.

The feed via 120*a* may include at least one of a 1-1-th electricity feed portion 121*a*, a 1-2-th electricity feed portion 122*a*, a 1-3-th electricity feed portion 123*a*, a 1-4-th electricity feed portion 124*a*, and a 1-5-th electricity feed portion 125*a*, and may be spaced apart from a ground plane 201*a*.

The 1-5-th electricity feed portion 125*a* may be implemented as a via, and may extend below the ground plane 201*a*.

The 1-4-th electricity feed portion 124*a* may extend in a horizontal direction different from an extending horizontal direction of the extending part 134*a*, and may be surrounded by a plurality of shielding vias 245*a*. The plurality of shielding vias 245*a* may be electrically connected to the ground plane 201*a*, and may extend in a downward direction.

Referring to FIG. 4B, a feed pattern may have a structure in which an inductive via, a second feed pattern, and an extension portion are omitted, and a first feed pattern 131*a* is included, and may be electrically connected to a feed via 120*a*. Since a width (W6) of a first feed pattern 131*a* may affect impedance of a feed pattern 130*a*, it may serve as a bandwidth design element of a patch antenna.

Figure 5A:
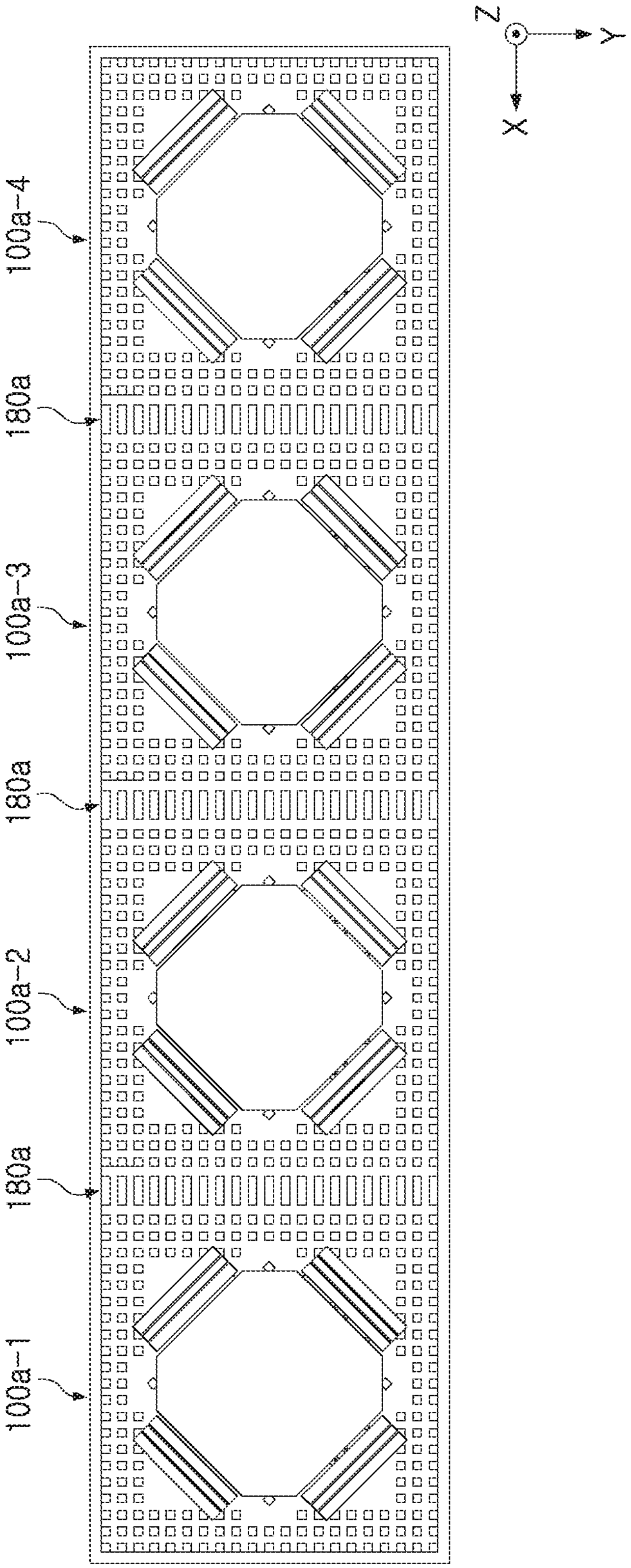
FIG. 5A is a plan view illustrating an arrangement of a plurality of antenna apparatuses according to an embodiment of the present disclosure.
Figure 5B:
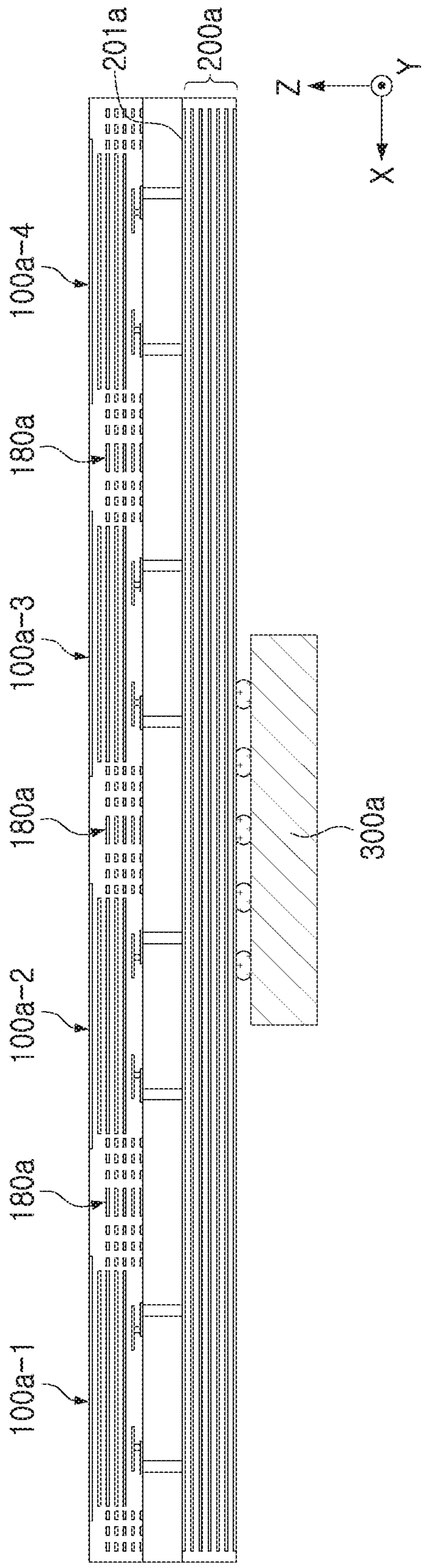
FIG. 5B is a cross-sectional view illustrating an arrangement of a plurality of antenna apparatuses according to an embodiment of the present disclosure.

FIG. 5A is a plan view illustrating an arrangement of a plurality of antenna apparatuses according to an embodiment of the present disclosure, and FIG. 5B is a cross-sectional view illustrating an arrangement of a plurality of antenna apparatuses according to an embodiment of the present disclosure.

Referring to FIGS. 5A and 5B, a plurality of antenna apparatuses 100*a*-1, 100*a*-2, 100*a*-3, and 100*a*-4 according to an embodiment of the present disclosure may be arranged in the x direction, and may be arranged on a ground plane 201*a*. The ground plane 201*a* may be included in a connection member 200*a*.

A shielding structure 180*a* may be disposed to interpose the plurality of antenna apparatuses 100*a*-1, 100*a*-2, 100*a*-3, and 100*a*-4. An IC 300*a* may be disposed below the connection member 200*a*. The IC 300*a* may be electrically connected to a wiring of the connection member 200*a* to transmit or receive an RF signal, and may be electrically connected to a ground plane of the connection member 200*a* to receive a ground. For example, the IC 300*a* may perform at least a portion of frequency conversion, amplification, filtering, phase control, and power generation to generate a converted signal.

Figure 6A:
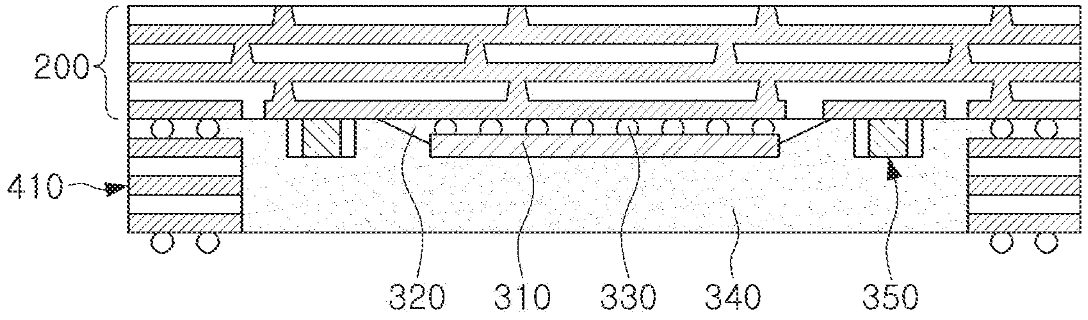
FIGS. 6A and 6B are side views illustrating connection members in which a ground plane is stacked, and lower structures thereof, included in antenna apparatuses according to embodiments of the present disclosure.
Figure 6B:
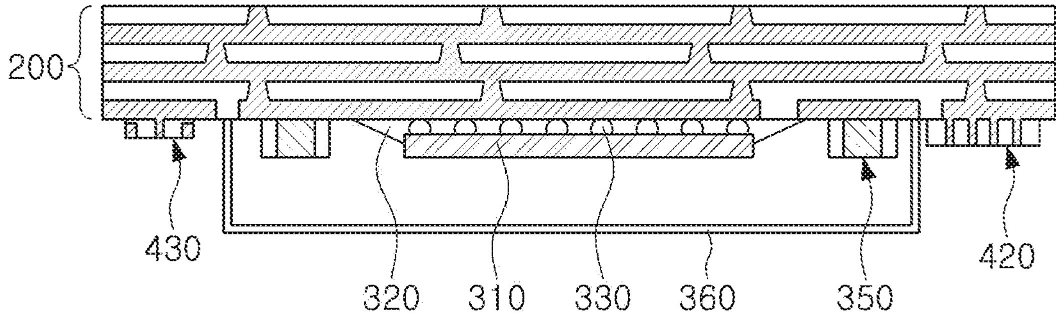

FIGS. 6A and 6B are side views illustrating connection members in which a ground plane is stacked, and lower structures thereof, included in antenna apparatuses according to embodiments of the present disclosure.

Referring to FIG. 6A, an antenna apparatus according to an embodiment of the present disclosure may include at least a portion of a connection member 200, an IC 310, an adhesive member 320, an electrical connection structure 330, an encapsulant 340, a passive component 350, and a sub-substrate 410.

The connection member 200 may have a structure in which the plurality of ground planes described above are stacked.

The IC 310 may be the same as the above-described IC, and may be disposed below the connection member 200. The IC 310 may be electrically connected to a wiring of the connection member 200 to transmit or receive an RF signal, and may be electrically connected to a ground plane of the connection member 200 to receive a ground. For example, the IC 310 may perform at least a portion of frequency conversion, amplification, filtering, phase control, and power generation to generate a converted signal.

The adhesive member 320 may bond the IC 310 and the connection member 200 to each other.

The electrical connection structure 330 may electrically connect the IC 310 and the connection member 200. For example, the electrical connection structure 330 may have a structure such as a solder ball, a pin, a land, and a pad. The electrical connection structure 330 may have a lower melting point than the wiring and the ground plane of the connection member 200, to electrically connect the IC 310 and the connection member 200 through a predetermined process using the lower melting point.

The encapsulant 340 may encapsulate at least a portion of the IC 310, and may improve heat dissipation performance and impact protection performance of the IC 310. For example, the encapsulant 340 may be implemented with a photo imageable encapsulant (PIE), an Ajinomoto build-up film (ABF), an epoxy molding compound (EMC), or the like.

The passive component 350 may be disposed on a lower surface of the connection member 200, and may be electrically connected to the wiring and/or the ground plane of the connection member 200 through the electrical connection structure 330.

The sub-substrate 410 may be disposed below the connection member 200, and may be electrically connected to the connection member 200, to receive an intermediate frequency (IF) signal or a base band signal from an external source and transmit the received IF signal or the received base band signal to the IC 310, or receive an IF signal or a base band signal from the IC 310 to transmit the received IF signal or the received base band signal to the external source. In this case, a frequency (e.g., 24 GHz, 28 GHz, 36 GHz, 39 GHz, or 60 GHz) of an RF signal may be greater than a frequency (e.g., 2 GHz, 5 GHz, 10 GHz, etc.) of an IF signal.

For example, the sub-substrate 410 may transmit or receive an IF signal or a base band signal to or from the IC 310 through a wiring that may be included in an IC ground plane of the connection member 200. Since a first ground plane of the connection member 200 is disposed between the IC ground plane and the wiring, the IF signal or the base band signal and the RF signal may be electrically isolated.

Referring to FIG. 6B, an antenna apparatus according to an embodiment of the present disclosure may include at least a portion of a shielding member 360, a connector 420, and a chip end-fire antenna 430.

The shielding member 360 may be disposed below a connection member 200 to confine an IC 310 together with the connection member 200. For example, the shielding member 360 may be arranged to cover the IC 310 and a passive component 350 together (e.g., a conformal shield) or to cover each of the IC 310 and the passive component 350 (e.g., a compartment shield). For example, the shielding member 360 may have a shape of a hexahedron having one surface open, and may have a hexahedral receiving space through coupling with the connection member 200. The shielding member 360 may be made of a material having high conductivity such as copper to have a short skin depth, and may be electrically connected to a ground plane of the connection member 200. Therefore, the shielding member 360 may reduce electromagnetic noise that may be received by the IC 310 and the passive component 350.

The connector 420 may have a connection structure of a cable (e.g., a coaxial cable, a flexible PCB), may be electrically connected to an IC ground plane of the connection member 200, and may have a role similar to that of the sub-substrate 410 described above. For example, the connector 420 may receive an IF signal, a base band signal and/or a power from a cable, or provide an IF signal and/or a base band signal to a cable.

The chip end-fire antenna 430 may transmit or receive an RF signal in support of an antenna apparatus, according to an embodiment of the present disclosure. For example, the chip end-fire antenna 430 may include a dielectric block having a dielectric constant greater than that of an insulating layer, and a plurality of electrodes disposed on both surfaces of the dielectric block. One of the plurality of electrodes may be electrically connected to the wiring of the connection member 200, and the other of the plurality of electrodes may be electrically connected to the ground plane of the connection member 200.

Figure 7A:
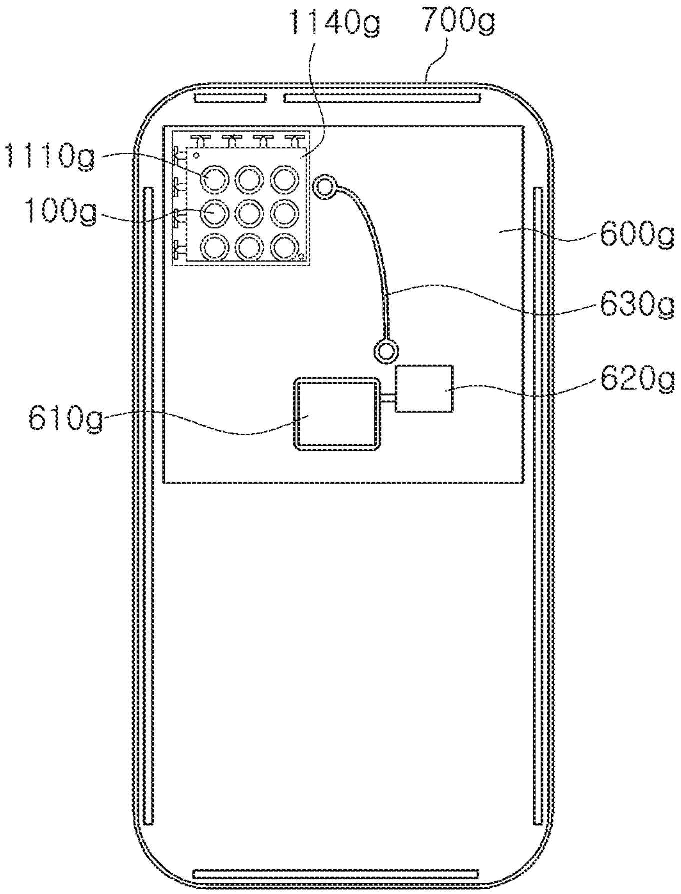
FIGS. 7A and 7B are plan views illustrating an arrangement of antenna apparatuses according to embodiments of the present disclosure, in an electronic device.
Figure 7B:
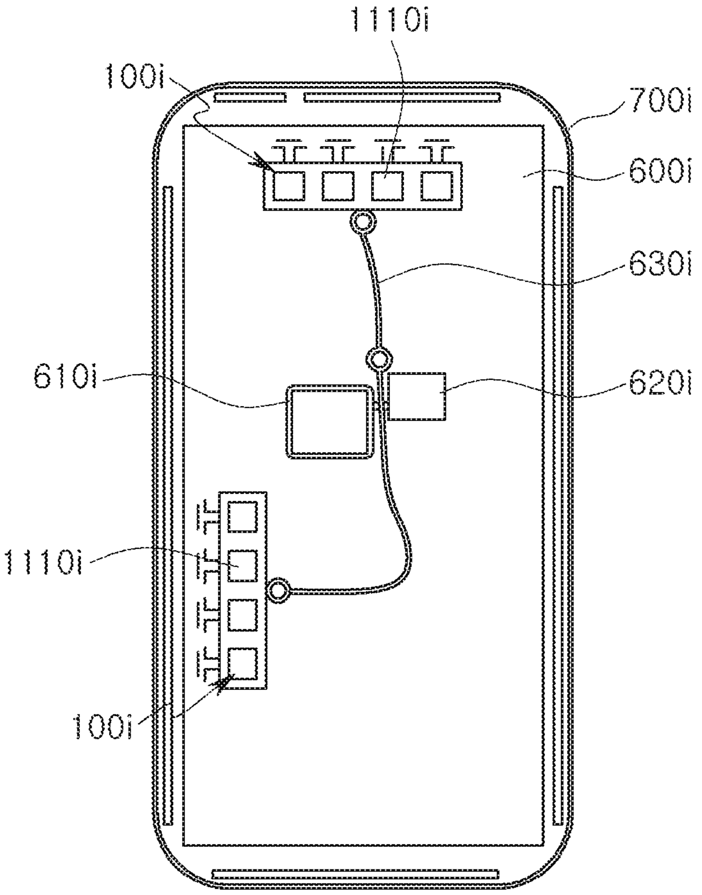

FIGS. 7A and 7B are plan views illustrating an arrangement of antenna apparatuses according to embodiments of the present disclosure, in an electronic device.

Referring to FIG. 7A, an antenna apparatus 100*g* including a patch antenna pattern 1110*g* and a dielectric layer 1140*g* may be disposed adjacent to a lateral boundary of an electronic device 700*g* on a set substrate 600*g* of the electronic device 700*g*.

The electronic device 700*g* may be a smartphone, a personal digital assistant, a digital video camera, a digital still camera, a network system, a computer, a monitor, a tablet, a laptop, a netbook, a television, a video game, a smart watch, an automotive, or the like, but is not limited to such devices.

A communications module 610*g* and a base band circuit 620*g* may also be arranged on the set substrate 600*g*. The antenna apparatus 100*g* may be electrically connected to the communications module 610*g* and/or the base band circuit 620*g* through a coaxial cable 630*g*.

The communications module 610*g* may include at least a portion of: a memory chip, such as a volatile memory (e.g., a DRAM), a non-volatile memory (e.g., a ROM), a flash memory, or the like; an application processor chip, such as a central processor (e.g., a CPU), a graphics processor (e.g., a GPU), a digital signal processor, a cryptographic processor, a microprocessor, a microcontroller, or the like; and a logic chip, such as an analog-to-digital converter, an application-specific IC (ASIC), or the like, to perform a digital signal process.

The base band circuit 620*g* may perform an analog-to-digital conversion, amplification in response to an analog signal, filtering, and frequency conversion, to generate a base signal. The base signal input/output from the base band circuit 620*g* may be transferred to the antenna apparatus 100*g* through a cable.

For example, the base signal may be transmitted to the IC through an electrical connection structure, a core via, and a wiring. The IC may convert the base signal into an RF signal in a millimeter wave (mmWave) band.

Referring to FIG. 7B, a plurality of antenna apparatuses 100*i* each including a patch antenna pattern 1110*i* may be respectively disposed adjacent to centers of sides of an electronic device 700*i*, which has a polygonal shape, on a set substrate 600*i* of the electronic device 700*i*. A communications module 610*i* and a base band circuit 620*i* may also be arranged on the set substrate 600*i*. The antenna apparatuses may be electrically connected to the communications module 610*i* and/or the base band circuit 620*i* through a coaxial cable 630*i*.

The pattern, via, and plane disclosed herein may include a metal material (e.g., a conductive material, such as copper (Cu), aluminum (Al), silver (Ag), tin (Sn), gold (Au), nickel (Ni), lead (Pb), titanium (Ti), alloys thereof, or the like), and may be formed according to plating methods such as a chemical vapor deposition (CVD) process, a physical vapor deposition (PVD) process, a sputtering process, a subtractive process, an additive process, a semi-additive process (SAP), a modified semi-additive process (MSAP), and or the like, but is not limited thereto.

The dielectric and insulating layers disclosed herein may be implemented with a thermosetting resin such as FR4, liquid crystal polymer (LCP), low temperature co-fired ceramic (LTCC), an epoxy resin, or a thermoplastic resin such as polyimide, or a resin impregnated into core materials such as glass fiber, glass cloth, and glass fabric together with inorganic filler, prepregs, Ajinomoto build-up film (ABF), FR-4, bismaleimide triazine (BT), a photoimageable dielectric (PID) resin, a copper clad laminate (CCL), a glass or ceramic based insulating material, or the like.

RF signals disclosed herein may have a format according to W-Fi (IEEE 802.11 family, etc.), WiMAX (IEEE 802.16 family, etc.), IEEE 802.20, long term evolution (LTE), Ev-DO, HSPA+, HSDPA+, HSUPA+, EDGE, GSM, GPS, GPRS, CDMA, TDMA, DECT, Bluetooth, 3G, 4G, 5G, and any other wireless and wired protocols designated later thereto, but are not limited thereto.

An antenna apparatus according to an embodiment of the present disclosure may improve or easily downsize antenna performance (e.g., gain, bandwidth, etc.).

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An antenna apparatus comprising:

a ground plane;

a patch antenna pattern disposed on an upper surface of the ground plane;

feed vias penetrating the ground plane, and respective ones of the feed vias disposed biased toward a first side and a second side, different from each other, from a center of the patch antenna pattern, and disposed spaced apart from the patch antenna pattern;

feed patterns respectively electrically connected to an upper end of a corresponding feed via, disposed spaced apart from the patch antenna pattern, and configured to provide a feed path to the patch antenna pattern; and first dummy patterns respectively comprising a polygonal shape, arranged three-dimensionally between the plurality of feed patterns, and at least partially overlapping the patch antenna pattern in a vertical direction, wherein the first dummy patterns comprise a plurality of patterns overlapping in the vertical direction.

2. The antenna apparatus according to claim 1, wherein the patch antenna pattern upper surface comprises a polygonal shape.

3. The antenna apparatus according to claim 1, further comprising second dummy patterns respectively comprising a polygonal shape and arranged three-dimensionally to surround a space in which the first dummy patterns are arranged.

4. The antenna apparatus according to claim 3, wherein a side of each of the plurality of first dummy patterns is oblique to a side of each of the plurality of second dummy patterns.

5. The antenna apparatus according to claim 4, wherein the patch antenna pattern upper surface comprises a rectangular shape, and wherein the second dummy patterns are arranged along at least a portion of the rectangular outline.

6. The antenna apparatus according to claim 1, wherein the patch antenna pattern upper surface comprises a rectangular shape.

7. The antenna apparatus according to claim 1, wherein the patch antenna pattern is disposed such that the first and second sides are oblique to each side of the upper surface of the ground plane.

8. The antenna apparatus according to claim 1, wherein each feed via comprises a feeding part extending downward from the upper end; a feed portion connected to the feeding part at a lower end in a corresponding through-hole of the ground plane; and a feed line connected to the feed portion, extending in a horizontal direction from the feed portion.

9. The antenna apparatus according to claim 1, further comprising extended patch antenna patterns respectively disposed to be spaced apart from the feed patterns, respectively disposed to be biased toward the first side and the second side from the center of the patch antenna pattern, and respectively disposed to be spaced apart from the patch antenna pattern.

10. The antenna apparatus according to claim 9, wherein each of the extended patch antenna patterns comprises:

a second extended patch antenna pattern; and a first extended patch antenna pattern disposed to be spaced apart from the second extended patch antenna pattern and disposed between the second extended patch antenna pattern and the patch antenna pattern.

11. The antenna apparatus according to claim 9, wherein each of the extended patch antenna patterns comprises:

a polygonal shape;

a first side parallel to a respective side of the polygonal shape of the patch antenna, and two second sides extending from the first side.

12. The antenna apparatus according to claim 11, wherein each of the extended patch antenna patterns comprises a third side parallel to the first side, wherein the two second sides extend perpendicular to the first side.

13. An antenna apparatus comprising:

a dielectric layer;

a polygonal shape patch antenna pattern disposed on an upper surface of the dielectric layer;

feed vias respectively disposed to penetrate the dielectric layer by at least a portion of a thickness of the dielectric layer, respectively disposed to be biased toward a first side and a second side, different from each other, from a center of the polygonal shape of the patch antenna pattern, and respectively disposed to be spaced apart from the patch antenna pattern;

feed patterns respectively electrically connected to an upper end of a corresponding feed via, respectively disposed to be spaced apart from the patch antenna pattern, and configured to provide a feed path to the patch antenna pattern;

extended patch antenna patterns respectively disposed to be spaced apart from the feed patterns, respectively disposed to be biased toward the first side and the second side from the center of the polygonal shape of the patch antenna pattern, respectively disposed to be spaced apart from the patch antenna pattern, and having a side oblique to a side of a ground plane in a top view; and first dummy patterns respectively arranged three-dimensionally between the plurality of feed patterns and comprising a plurality of patterns overlapping in a vertical direction.

14. The antenna apparatus according to claim 13, wherein each of the extended patch antenna patterns comprises:

a second extended patch antenna pattern; and a first extended patch antenna pattern disposed to be spaced apart from the second extended patch antenna pattern and disposed between the second extended patch antenna pattern and the patch antenna pattern, wherein a width of the second extended patch antenna pattern is different from a width of the first extended patch antenna pattern.

15. The antenna apparatus according to claim 13, wherein the upper surface of the patch antenna pattern comprises a rectangular shape, and wherein the number of the extended patch antenna pattern is less than 8.

16. The antenna apparatus according to claim 15, wherein the number of the extended patch antenna pattern is 4.

17. The antenna apparatus according to claim 15, wherein an upper surface of each of the extended patch antenna patterns comprises a first side parallel to a respective side of the rectangular shape of the patch antenna, two second sides extending from the first side, and a third side spaced apart from and parallel to the first side.

18. The antenna apparatus according to claim 17, wherein the first, second, and third sides of each of the extended patch antenna patterns are oblique to each side of the upper surface of the dielectric layer.

19. The antenna apparatus according to claim 13, wherein the upper surface of the patch antenna pattern comprises a rectangular shape, and the first and second sides of the patch antenna pattern are oblique to each side of the upper surface of the dielectric layer.

20. The antenna apparatus according to claim 19, further comprising second dummy patterns, wherein the second dummy patterns are arranged along at least a portion of the rectangular outline.

21. The antenna apparatus according to claim 13, wherein the first dummy patterns respectively comprises a polygonal shape.

22. The antenna apparatus according to claim 21, further comprising second dummy patterns respectively comprising a polygonal shape and arranged three-dimensionally to surround a space in which the plurality of first dummy patterns are arranged.

23. The antenna apparatus according to claim 22, wherein a side of each of the first dummy patterns is oblique to a side of each of the second dummy patterns.

* * * * *